US011504286B2

(12) United States Patent
Cooper et al.

(10) Patent No.: US 11,504,286 B2
(45) Date of Patent: Nov. 22, 2022

(54) PNEUMATIC POWERED MOBILITY DEVICES

(71) Applicants: University of Pittsburgh—Of the Commonwealth System of Higher Education, Pittsburgh, PA (US);
(Continued)

(72) Inventors: Rory Alan Cooper, Gibsonia, PA (US); Hongwu Wang, Edmond, OK (US); Brandon Joseph Daveler, Pittsburgh, PA (US); Benjamin Todd Gebrosky, Gibsonia, PA (US); Garrett G. Grindle, Pittsburgh, PA (US); Jonathan L. Pearlman, Pittsburgh, PA (US); Urs Schneider, Stuttgart (DE); David Minzenmay, Stuttgart (DE)

(73) Assignees: University of Pittsburgh—Of the Commonwealth System of Higher Education, Pittsburgh, PA (US);
(Continued)

( * ) Notice: Subject to any disclaimer, the term of this patent is extended or adjusted under 35 U.S.C. 154(b) by 878 days.

(21) Appl. No.: 16/067,992

(22) PCT Filed: Jan. 4, 2017

(86) PCT No.: PCT/US2017/012123
§ 371 (c)(1),
(2) Date: Jul. 3, 2018

(87) PCT Pub. No.: WO2017/120184
PCT Pub. Date: Jul. 13, 2017

(65) Prior Publication Data
US 2019/0021920 A1    Jan. 24, 2019

Related U.S. Application Data

(60) Provisional application No. 62/274,556, filed on Jan. 4, 2016.

(51) Int. Cl.
*A61G 5/04* (2013.01)
*A61G 5/10* (2006.01)
(Continued)

(52) U.S. Cl.
CPC ............... *A61G 5/04* (2013.01); *A61G 5/045* (2013.01); *A61G 5/048* (2016.11); *A61G 5/10* (2013.01);
(Continued)

(58) Field of Classification Search
CPC .......... A61G 5/04; B60K 7/0023; B60K 3/02; B60K 3/00; B60K 17/043; B60K 7/0007;
(Continued)

(56) References Cited

U.S. PATENT DOCUMENTS 3,925,984 A * 12/1975 Holleyman ............. B60K 3/02
60/370
3,980,152 A * 9/1976 Manor .................... B60L 50/90
267/64.11
(Continued)

FOREIGN PATENT DOCUMENTS

CN    201317435 Y    9/2009
CN    105125354      12/2015
(Continued)

OTHER PUBLICATIONS

Pneumatic Radial Piston Motor, Luftmotorenkatalog_2008_V10. indd, 8, 1-6.
(Continued)

*Primary Examiner* — Jacob B Meyer
*Assistant Examiner* — Harold Eric Pahlck, III
(74) *Attorney, Agent, or Firm* — Bartony & Associates, LLC

(57) ABSTRACT

A personal mobility device includes a frame, a plurality of wheels attached to the frame and one or more pneumatic
(Continued)

motors. Each of the one or more pneumatic motors has a drive shaft in operative connection with at least one of the plurality of wheels. The personal mobility device further includes at least one tank (that is, a storage container) for storage of a pressurized gas in operative connection with the one or more pneumatic motors to supply pressurized gas to the one or more pneumatic motors and a control system in operative connection with the at least one tank and with the one or more pneumatic motors.

15 Claims, 13 Drawing Sheets

(51) Int. Cl.
  *B60K 7/00* (2006.01)
  *F03C 2/00* (2006.01)
  *F16H 7/06* (2006.01)
  *F16H 48/20* (2012.01)

(52) U.S. Cl.
  CPC .......... *A61G 5/1051* (2016.11); *B60K 7/0023* (2013.01); *F03C 2/00* (2013.01); *F16H 7/06* (2013.01); *F16H 48/20* (2013.01); *B60K 2007/0038* (2013.01); *B60K 2007/0092* (2013.01); *B60Y 2200/126* (2013.01); *B60Y 2200/13* (2013.01); *B60Y 2200/84* (2013.01)

(58) Field of Classification Search
  CPC ....... B60Y 2200/126; F17C 2205/0138; F16H 1/28
  See application file for complete search history.

(71) Applicants: FRAUNHOFER-GESELLSCHAFT ZUR FOERDERUNG DER ANGEWANDTEN FORSCHUNG E.V., Munich (DE) The United States Government as represented by the Department of Veterans Affairs, Washington, DC (US);

(73) Assignees: FRAUNHOFER-GESELLSCHAFT ZUR FOERDERUNG DER ANGEWANDTEN FORSCHUNG E.V., Munich (DE) The United States Government as represented by the Department of Veterans Affairs, Washington, DC (US);

(56) References Cited

U.S. PATENT DOCUMENTS

| | | | |
|---|---|---|---|
| 4,370,857 A | | 2/1983 | Miller |
| 4,596,119 A | * | 6/1986 | Johnson .................... B60K 3/02 180/165 |
| 5,878,829 A | | 3/1999 | Kanno |
| 7,926,610 B2 | * | 4/2011 | Adli ........................ B60L 8/003 180/302 |
| 8,640,801 B2 | * | 2/2014 | Hennings ............. B60K 7/0007 180/65.6 |
| 2004/0144577 A1 | * | 7/2004 | Anderson ................ B60K 6/46 180/65.245 |
| 2004/0183276 A1 | | 9/2004 | Silva |
| 2010/0078245 A1 | * | 4/2010 | Rolfe ..................... B60K 11/04 188/218 XL |
| 2011/0226781 A1 | * | 9/2011 | Walser ..................... F17C 1/16 493/84 |
| 2011/0238265 A1 | * | 9/2011 | Trowell .................. B60L 50/60 701/41 |
| 2012/0068435 A1 | * | 3/2012 | Birmanns .............. A61G 5/048 702/19 |
| 2014/0318877 A1 | * | 10/2014 | Edwards, Jr. ............ B60K 3/02 180/54.1 |
| 2015/0190292 A1 | | 7/2015 | Robins |
| 2015/0298737 A1 | | 10/2015 | Kaesgen |
| 2017/0151108 A1 | * | 6/2017 | Pick ........................ A61G 5/026 |

FOREIGN PATENT DOCUMENTS

| | | |
|---|---|---|
| DE | 19534628 A1 | 5/1996 |
| EP | 2451667 A1 | 5/2012 |
| EP | 3399952 | 11/2018 |
| WO | WO2006046246 A2 | 5/2006 |
| WO | WO20170120184 | 7/2017 |

OTHER PUBLICATIONS

Nash, M.S., et al., "Power-assisted wheels ease energy costs and perceptual responses to wheelchair propulsion in persons with shoulder pain and spinal cord injury" Archives of Physical Medicine and Rehabilitation, 2008. 89(11): p. 2080-2085.

\* cited by examiner

PNEUMATIC POWERED MOBILITY DEVICES

CROSS-REFERENCE TO RELATED APPLICATIONS

This application is a national phase filing of PCT International Patent Application No. PCT/US2017/012123, filed Jan. 4, 2017, which claims benefit of U.S. Provisional Patent Application Ser. No. 62/274,556, filed Jan. 4, 2016, the disclosures of which are incorporated herein by reference.

GOVERNMENTAL INTEREST

This invention was made with government support under grant no. 1144584 awarded by the National Science Foundation and grant no. B9250C awarded by the U.S. Department of Veterans Affairs. The government has certain rights in this invention.

BACKGROUND

The following information is provided to assist the reader in understanding technologies disclosed below and the environment in which such technologies may typically be used. The terms used herein are not intended to be limited to any particularly narrow interpretation unless clearly stated otherwise in this document. References set forth herein may facilitate understanding of the technologies or the background thereof. The disclosure of all references cited herein are incorporated by reference.

Personal mobility devices such as wheelchairs and scooters are very beneficial to people with mobility impairments. As used herein, the term "mobility device" refers to a device to transport a person (typically a single person), thereby increasing the mobility of the person. Mobility device may be manually powered or at least partially powered via a non-manual power source. Currently available power mobility devices (PMD) tend to be inefficient, heavy, maintenance intensive, environmentally sensitive, environmentally disruptive, and difficult to transport (for example, in a motor-vehicle or on an airplane). Electric powered PMD rely on batteries (mostly lead-acid) that can be hazardous and are increasingly costly and difficult to recycle. Even though batteries are widely used in hybrid and electric powered cars and in PMD, battery technology remains expensive and presents many safety issues (for example, fire, electric shock, electromagnetic interference, burns from high temperature, out-gassing, and other electrical/power failure modes) for PMD usage. There is a need for new power sources, power management systems, and drive-trains for PMD.

SUMMARY

In one aspect, a personal mobility device includes a frame, a plurality of wheels attached to the frame and one or more pneumatic motors. Each of the one or more pneumatic motors has a drive shaft in operative connection with at least one of the plurality of wheels. The personal mobility device further includes at least one tank (that is, a storage container) for storage of a pressurized gas in operative connection with the one or more pneumatic motors to supply pressurized gas to the one or more pneumatic motors and a control system in operative connection with the at least one tank and with the one or more pneumatic motors. The control system may, for example, include a direction control valve. A cumulative maximum torque for the one or more pneumatic motors is at least 16 Nm, at least 24 Nm, at least 32 Nm or at least 64 Nm. The personal mobility device may include one or a plurality of tanks for storage of the pressurized gas having a pressure of at least 17.2 MPa, at least 27.6 MPa, or at least 31 MPa in operative connection with the one or more pneumatic motors. In the case that the personal mobility device includes a plurality of tanks, the plurality of tanks may, for example, be connected in series.

As use herein, the term "wheel" includes any mobility device to contact a surface and provide motion of the personal mobility device. Such mobility devices are typically rotary member such as wheels or tracks.

In a number of embodiments, a maximum rotation speed of the drive shafts of each of the one or more pneumatic motors is less than 2000 rpm, less than 1000 rpm, or less than 600 rpm. In a number of embodiments, at least one of the one or more pneumatic motors is in operative connection with the at least one of the plurality of wheels via a gear system or a pulley system having a conversion ratio in the range of 2:1 to 1:2 or in the range of 1.5:1.0 to 1.0:1.5.

In a number of embodiments, the at least one of the one or more pneumatic motors is in operative connection with the at least one of the plurality of wheels via a first gear in operative connection with the drive shaft of the at least one of the one or more pneumatic motors and a second gear in operative connection with an axle about which the at least one of the plurality of wheel rotates. The second gear may, for example, be in operative connection with a differential. The differential may, for example, be a limited slip differential.

The drive shaft of at least one of the one or more pneumatic motors in a number of embodiments may be in operative connection with the at least one of the plurality of wheels to drive the at least one of the plurality of wheels directly.

In a number of embodiments, the at least one of the plurality of wheels is positioned at a rear of the frame. In a number of embodiments, the personal mobility device is a wheelchair or a scooter. The personal mobility device may, for example, be a power assisted wheelchair, and at least one of the plurality of wheels may further be powerable (that is, capable of being powered) under manual power. The control system may, for example, include an activatable valve control which is activated by at least one of an acceleration threshold or an inclination threshold in operative connection with the at least one of the plurality of wheels.

In a number of embodiments, an operating pressure of pressurized gas supplied to the one or more pneumatic motors is in the range of 0.34 MPa (50 psi) to 1.03 (150 psi) or in the range of 0.62 MPa (90 psi) to 0.83 (120 psi). In a number of embodiments, each of the one or more pneumatic motors is rotary piston pneumatic motor.

In another aspect, a method of providing powered drive to a personal mobility device including a frame and a plurality of wheels attached to the frame, includes providing one or more pneumatic motors, each of the one or more pneumatic motors having a drive shaft in operative connection with at least one of the plurality of wheels, providing at least one tank for storage of pressurized gas in operative connection with the one or more pneumatic motors to supply pressurized gas to the one or more pneumatic motors; and providing a control system in operative connection with the at least one tank and with the one or more pneumatic motors, wherein a cumulative maximum torque for the one or more pneumatic motors is at least 16 Nm, at least 24 Nm, at least 32 Nm or at least 64 Nm. The elements of the personal mobility device may, for example, be further defined as described above.

The present devices, systems, and methods, along with the attributes and attendant advantages thereof, will best be appreciated and understood in view of the following detailed description taken in conjunction with the accompanying drawings.

DESCRIPTION

Figure 1:
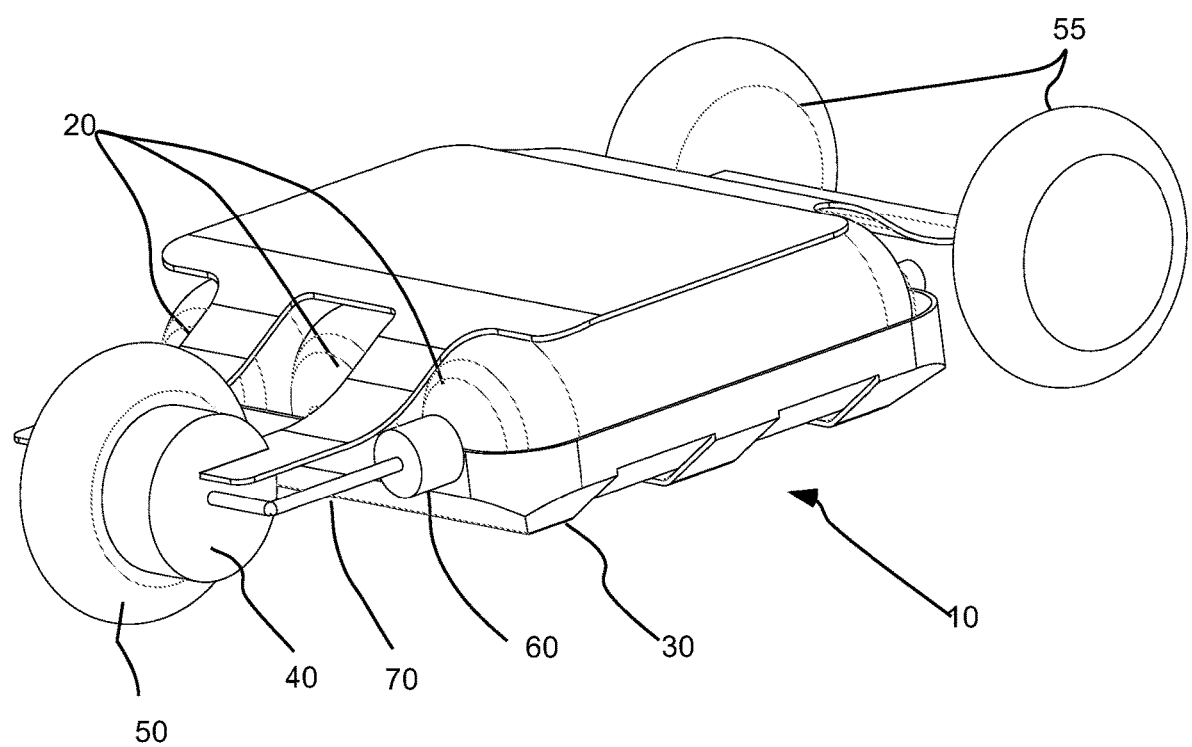
FIG. 1 illustrates perspective view of an embodiment of a pneumatic drive system for a powered mobility device hereof.

The present devices, systems, and methods, along with the attributes and attendant advantages thereof, will best be appreciated and understood in view of the following description taken in conjunction with any accompanying drawings.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a pneumatic motor" includes a plurality of such pneumatic motors and equivalents thereof known to those skilled in the art, and so forth, and reference to "the pneumatic motor" is a reference to one or more such pneumatic motors and equivalents thereof known to those skilled in the art, and so forth. Recitation of ranges of values herein are merely intended to serve as a shorthand method of referring individually to each separate value falling within the range. Unless otherwise indicated herein, and each separate value as well as intermediate ranges are incorporated into the specification as if it were individually recited herein. All methods described herein can be performed in any suitable order unless otherwise indicated herein or otherwise clearly contraindicated by the text.

Most PMD users, both community dwelling and institutional living, typically travel short distances over the course of a day, and much of that travel is indoors. Because PMD users often do not travel far and could have access to recharging stations (e.g., home, work, school, clinic, retail outlet) with most of their mobility being indoors; energy density of a power source for the PMD is less of an issue with PMD than with cars or other vehicles. In a number of embodiments, PMDs hereof include a high-pressure, pneumatic powered drive systems. As used herein, the term "pneumatic" refers to a system operated by air or other gas under pressure. For example, relatively low-cost, but efficient rotary piston air motors and portable high pressure pneumatic cylinders are used in a number of embodiments of PMD hereof to make pressurized gas (for example, air) a practical alternative to electric power for PMD.

Pneumatic drive systems provide a number of advantages over electric/battery powered drive systems in PMD. For example, pneumatic drive systems provide for relatively quick and unlimited recharging. For example, a pneumatic drive system that includes a single or set of high-pressure air (HPA) or other high pressure fluid tanks allows the system to be recharged in 1-10 minutes, whereas electrically powered vehicles require recharging times between 5-8 hours for the batteries thereof. The short recharge time of pneumatic drive systems may allow a pneumatically powered vehicle to be used almost continuously. Moreover, there are many sources for recharging high-pressure air (or other gas) tanks, including, but not limited to, sporting goods stores, scuba diving shops, fire departments etc. Unlike rechargeable batteries, which often have a relatively short rechargeable lifetime, a high-pressure gas tank can be recharged repeatedly without degradation in performance.

Pneumatic drive systems significantly decrease weight as compared to electric/battery powered systems. Conventional electrical drive systems, which include batteries, an electric motor, and electronics for controls, typically result in a PMD weighing 400 pounds or more. By replacing the electrical drive system with a pneumatic drive system, the vehicle weight may be significantly reduced.

FIG. 1 illustrates a representative embodiment of a pneumatic drive system for a PMD 10 which includes a single or a series of pressurized fluid tanks 20 supported on a frame 30 of PMD 10. As described above, pressurized fluid tanks 20 may be pressurized air tanks. However, other compressed or pressurized gases may be used. Moreover, liquefied gases may be used for propulsion via an expansion chamber. As used herein, the term "pressurized gas" include both compressed gasses and liquefied gases. The drive system for PMD 10 further includes a pneumatic powered motor 40 in operative connection with one or more drive wheels 50, a control system 60 (which may, for example, include one or more control valves) and associated tubing 70. In the embodiment of FIG. 1, PMD 10 includes a single drive wheel 50 in the back thereof and two non-driven wheels 55 in the front thereof. Such a configuration is sometimes referred to as a reverse tadpole configuration or design.

Figure 2A:
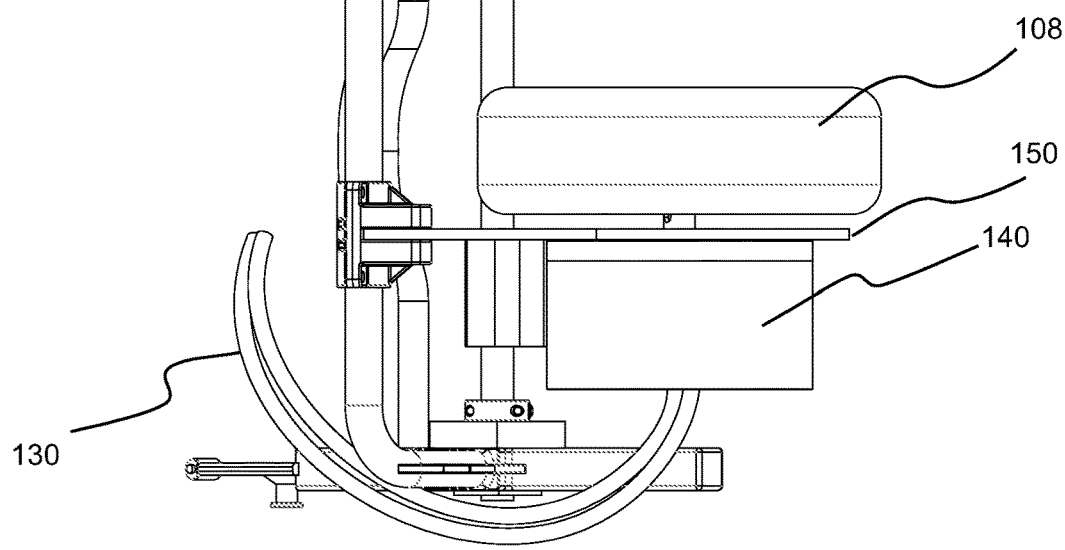
FIG. 2A illustrates a top view of a rearward section of a three-wheel embodiment of a powered mobility device hereof.
Figure 2B:
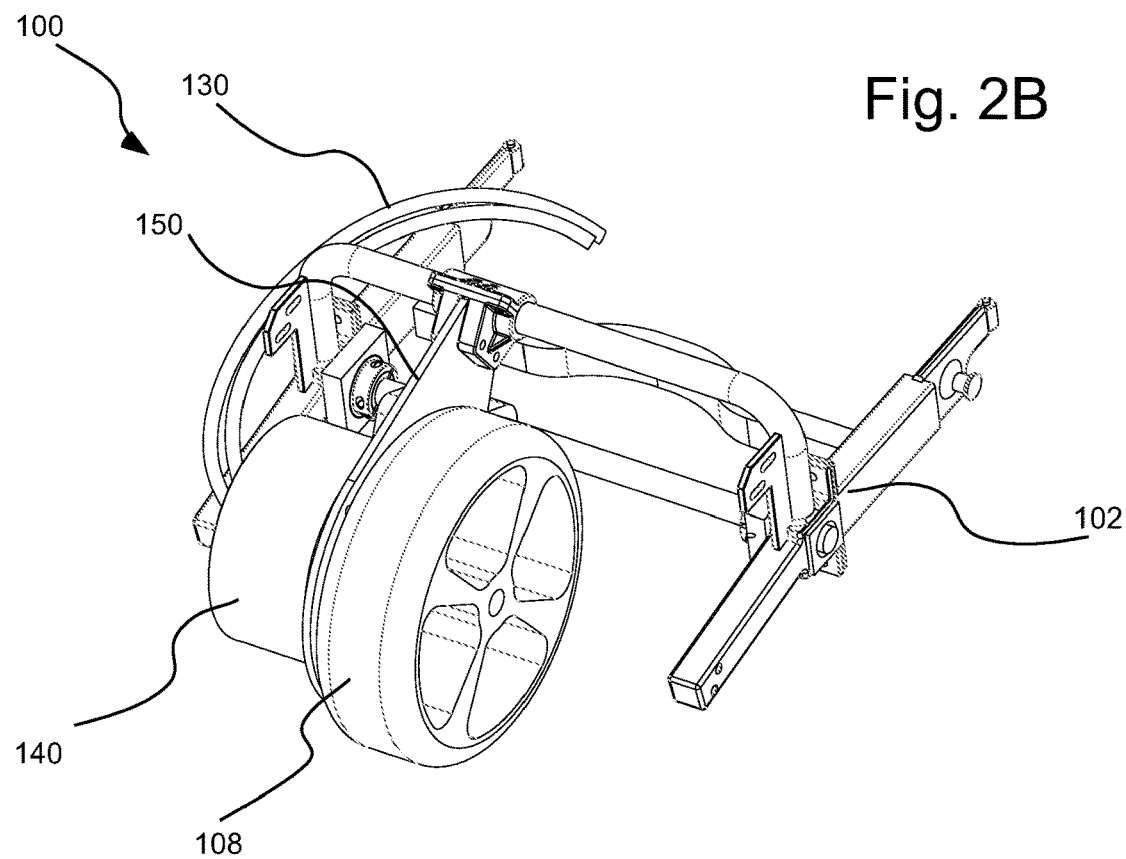
FIG. 2B illustrates a perspective view of the rearward section of the three-wheel embodiment of a powered mobility device of FIG. 2A.
Figure 2C:
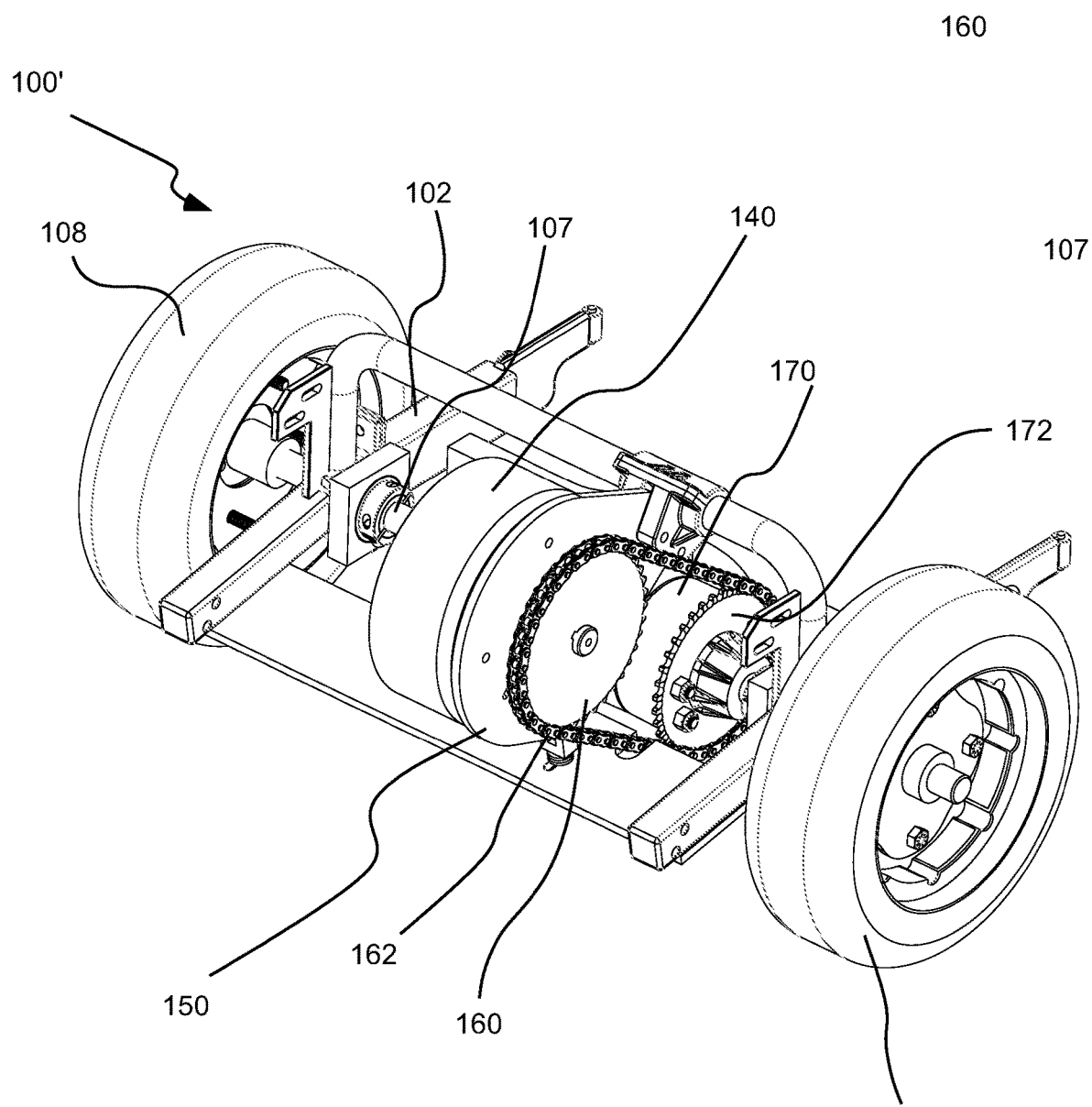
FIG. 2C illustrates a perspective view of a rearward section of a four-wheel embodiment of a powered mobility device hereof.

FIGS. 2A through 2C illustrates embodiments of a PDM 100 (FIGS. 2A and 2B) and a PDM 100' (FIG. 2C), which were manufactured by installing a pneumatic system including a control system including a directional control valve and a flow control valve, line tubing 130, and a pneumatic motor 140 into or upon electric mobility scooter frame 102 (see FIG. 2C). Like elements in FIGS. 2A through 2C are numbed the same. The original electronic system of each scooter, including two batteries, an electric motor, a computer, and electrical wiring, was first removed. A directional control valve allowed devices 100 and 100' to be driven forward or backward while a flow control valve operated as a speed control by restricting/controlling the airflow to pneumatic motor 140. Such control components are discussed further in connection with device 200 of FIGS. 4A-4E below. Frame 102 was identical in three-wheel PDM 100 and four-wheel PDM 100'. In PMD 100 and PDM 100', pneumatic motor 140 was mounted to a plate 150 mounted on a rearward end of frame 102 devices 100 and 100', and could be replaced with relative ease to, for example, study different pneumatic motors. In PDM/device 100', a sprocket 160 was secured to and rotated about the end of the output or drive shaft of motor 140. Sprocket or gear 160 was operatively connected to a gear or sprocket 172 of a differential 170 (for example, a limited slip differential) on a rear axle 107 of PDM 100' via a drive chain 162. The location of motor 140 could be adjusted along plate 150. Motor 140 was movably mounted to enable chain 162 to be tightened an appropriate amount for optimal operation.

The gear ratio used between motor 140 and differential 170 on rear axle 107 was adjustable. In several studied embodiment, sprocket or gear 172 of differential 170 on PMD 100' had 36 teeth and was not altered during the studies hereof. Three different sprockets 160 were removably mounted to the output or drive shaft of motor 140. The studies sprockets 160 included 30, 36, and 43 teeth. Sprockets 160 and 172 were selected to provide gear ratios between motor 140 and differential 170 of 1:1.2, 1:1, and 1.2:1, respectively. Two different tube diameters were studied for line tubing 130: 6.35 mm (0.25 inch) and 9.53 mm (0.375 inch).

In the embodiment of four-wheel PDM 100, the original electric drive system was thus replaced with motor 140 and differential 170 to drive axle 107 in operative connection with rear wheels 108. In three-wheel PDM 100, single rear wheel 108 was mounted directly to the output shaft of pneumatic motor 140, and no differential was included.

Two different size pneumatic radial piston motors were tested in the studies hereof: a BIBUS® EasyDrive PMO 1800 (a pneumatic radial piston motor available from Bibus AG of Fehraltorf, Switzerland and having a rated maximum torque of 1600 Ncm or 16 Nm) and a BIBUS EasyDrive PMO 3600 (a pneumatic radial piston motor available from Bibus AG and having a rated maximum torque under load of 3200 Ncm or 32 Nm). The PMO 3600 model could output approximately twice the total torque as the PMO 1800 model, which also results in half the output velocity. Velocity was measured using a Mitutoyo PH-200LC tachometer and air flow rate was measured with a SMC PFMB7501-N04-A digital flow switch for each of the tests performed.

In a number of embodiments, a value or quotient equal to the rated payload in Newtons or N of the personal mobility device divided by the cumulative maximum torque in Nm (without gearing or conversion) of the pneumatic motor(s) of the device (in the operating range of pressure thereof) is no greater than 55.6. For example, in the case of a PMD weighing 756 N (170 pounds) and being rated for used with a person weighing up to 10231 N (230 pounds), the maximum rated payload of the PDS is 1779 N (400 pounds; that is, the weight of the device plus the maximum weight of the occupant). In such a device, the cumulative maximum torque of the motor(s) is at least 32 Nm. The cumulative maximum torque may, for example, be provide by a single pneumatic motor having a maximum torque of 32 Nm, by two pneumatic motors which each have a maximum torque of 16 Nm, etc. The value or quotient of 55.6 is based upon travel on surfaces compliant with the requirements of the Americans with Disabilities Act or ADA. In the case of travel over surface that are not compliant with the ADA such as grass or beach surfaces, the value or quotient equal to the rated payload in Newtons or N of the personal mobility device divided by the cumulative maximum torque in Nm of the pneumatic motor(s) of the device is no greater than 27.8. In a number of embodiments, the cumulative maximum torque (without gearing/conversion) of the pneumatic motors hereof is at least 16 Nm, at least 24 Nm, at least 32 Nm, at least 48 Nm, at least 64 Nm or at least 80 Nm. A cumulative torque of 16 Nm may, for example, be used in PMD for use with small or pediatric users.

In a number of embodiments, the pneumatic motors hereof include a rotating output or drive shaft. The output or drive shaft may be connected directly to a wheel of a device hereof or connected through an intermediate mechanism such as, for example, a gear system or pully system. In a number of embodiments of pneumatic motors hereof, the output or drive shaft has a maximum rotational speed (in the operating pressure range thereof and without gearing/conversion) of no greater than 2000 rpm, no greater 1000 rpm, no greater than 600 rpm of no greater than 400 rpm.

Tests were performed using the 6.35 mm and 9.53 mm airline tubing diameters described above, the gear ratios of 1:1, 1:1.2, and 1.2:1 described above and at operating pressures of 0.621 MPa (6.21 Bar; 90 pounds per square inch or psi) and 0.827 MPa (8.27 bar or 120 psi). The technical specifications of both the PMO 1800 and the PMO 3600 motors are, for example, set forth in Pneumatic Radial Piston Motor, BG-002-08, Luftmotorenkatalog, V10, indd 4 (2008) available from Bibus AG, the disclosure of which is incorporated herein by reference. The pistons of motor 140 are arranged in a star pattern and slide along a curved surface of the casing. Pressurized gas/air is supplied from the center of motor 140 to each vane through a fixed piston control shaft by way of the floating piston control ring, which enables each piston to be activated in order. The air forces these pistons to push on the housing, thereby causing rotation. Larger diameter tubing between the source of pressurized gas and motor 140 enables greater air flow to each piston, increasing the range of speeds at which motor 140 can rotate. Increasing the operating pressure improves the overall performance of motor 140. Adjusting the gear ratio on can increase either the output torque or velocity, depending on the criteria that need to be met.

Preliminary testing using the four-wheel version of prototype 1 with a 1.44 L tank was preformed prior to the range testing of the different component configurations to understand whether the prototype was capable of traveling a reasonable distance on a fixed amount of air. Testing of both versions of PMD 100 and PMD 100' were performed to calculate the range the prototype could travel under ideal conditions using different configurations of components and operating pressures. Testing was performed on a multi-drum testing mechanism typically used for the International Organization for Standardization fatigue testing for wheelchairs. See, for example, Nash, M. S., et al., "Power-assisted wheels ease energy costs and perceptual responses to wheelchair propulsion in persons with shoulder pain and spinal cord injury" *Archives of Physical Medicine and Rehabilitation*, 2008. 89(11): p. 2080-2085. A 100 kg test dummy was secured to the seat of the prototype to simulate the typical usage of the mobility device when traveling over a flat, smooth surface with a user. As described above, the velocity of the wheels was measured using a tachometer (Mitutoyo PH-200LC) and the airflow rate was measured using a digital flow meter (SMC, PFMB7501-N04-A). Constant operating pressures of 0.621 and 0.827 MPa were tested via a constant supply from the laboratory air source.

In preliminary testing, four-wheel PDM 100' traveled 800 m with a 1.44 L air tank 160, indicating that pneumatic drive systems in PMD is feasible. At a mass of 57.7 kg, the weight of four-wheel device 100' was 31% lower than the weight of the electric mobility scooter prior to the removal of its electric drive system.

The testing procedures at constant pressure included adjusting the flow control valve such that the desired velocity of the PMD wheels was achieved. PMD wheel velocities started at 0.1 m/s and increased in increments of 0.1 m/s until the airflow rate reached 210 L/minute (which was the limit of the digital flow switch used in the studies) or the maximum speed of the PMD was reached. Airflow rates at each of the PMD wheel velocities were entered into a spreadsheet for data analysis. Each different configuration was created by changing a single component or parameter and repeating the testing procedure. A breakdown of the tests performed for each of the component configurations is shown in Table 1.

TABLE 1

| Test | # Wheels | Motor | Tubing (mm) | Pressure (kPa) | # Teeth |
|---|---|---|---|---|---|
| 1 | 4 | 1800 | 6.35 | 621 | 30 |
| 2 | 4 | 1800 | 6.35 | 621 | 36 |
| 3 | 4 | 1800 | 9.53 | 621 | 30 |
| 4 | 4 | 1800 | 9.53 | 827 | 30 |
| 5 | 4 | 1800 | 9.53 | 621 | 36 |
| 6 | 4 | 1800 | 9.53 | 827 | 36 |
| 7 | 4 | 3600 | 6.35 | 621 | 30 |
| 8 | 4 | 3600 | 6.35 | 827 | 30 |
| 9 | 4 | 3600 | 6.35 | 621 | 36 |
| 10 | 4 | 3600 | 6.35 | 827 | 36 |
| 11 | 4 | 3600 | 9.53 | 621 | 30 |
| 12 | 4 | 3600 | 9.53 | 827 | 30 |
| 13 | 4 | 3600 | 9.53 | 621 | 36 |
| 14 | 4 | 3600 | 9.53 | 827 | 36 |
| 15 | 4 | 3600 | 9.53 | 621 | 43 |
| 16 | 4 | 3600 | 9.53 | 827 | 43 |
| 17 | 3 | 3600 | 9.53 | 621 | Direct drive |
| 18 | 3 | 3600 | 9.53 | 827 | Direct drive |

Estimated traveling ranges were calculated using the PMD with 24.94 cm wheel diameter and two 9 L high pressure air (HPA) tanks (a common scuba tank volume) at a pressure of 310 bar. Calculating the estimated ranges using two HPA tanks was chosen because of the size of the tanks and the limited space for them onboard a PMD/device hereof. The estimated ranges were then compared between each of the different components to determine an optimal configuration for the greatest traveling range at the target traveling speed. In addition to the multi-drum testing, testing was performed to determine whether the prototype PMD could climb a 10° slope with a 100-kilogram user (ANSI/RESNA requirement). The result of the test was either pass or fail as velocity, air consumption, and pressure were not measured.

Figure 3A:
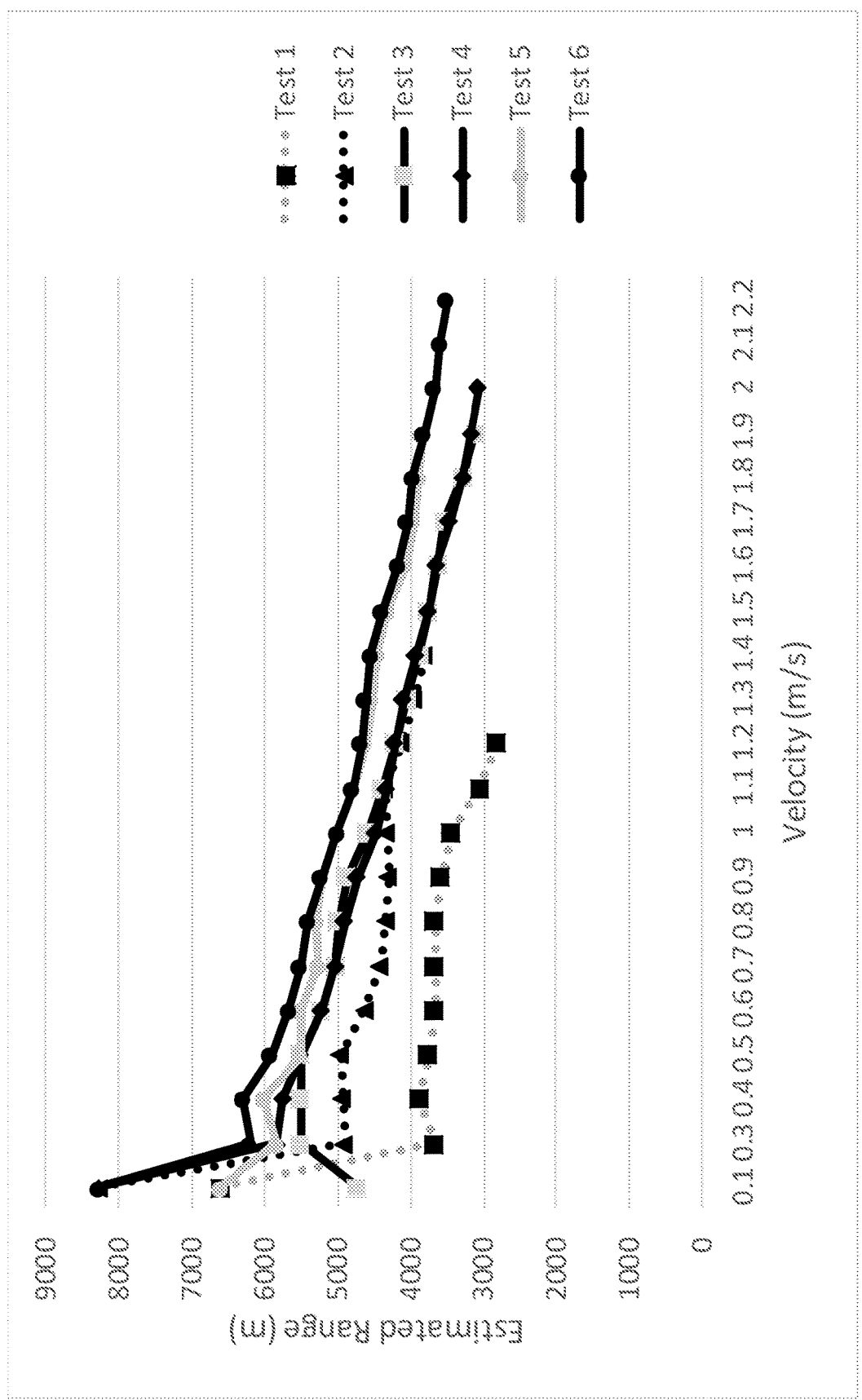
FIG. 3A illustrates a graph of estimated range as a function of velocity for several configurations of the powered mobility device of FIGS. 2A and 2B including a rotary piston pneumatic motor rated at a torque of 1600 Ncm.
Figure 3B:
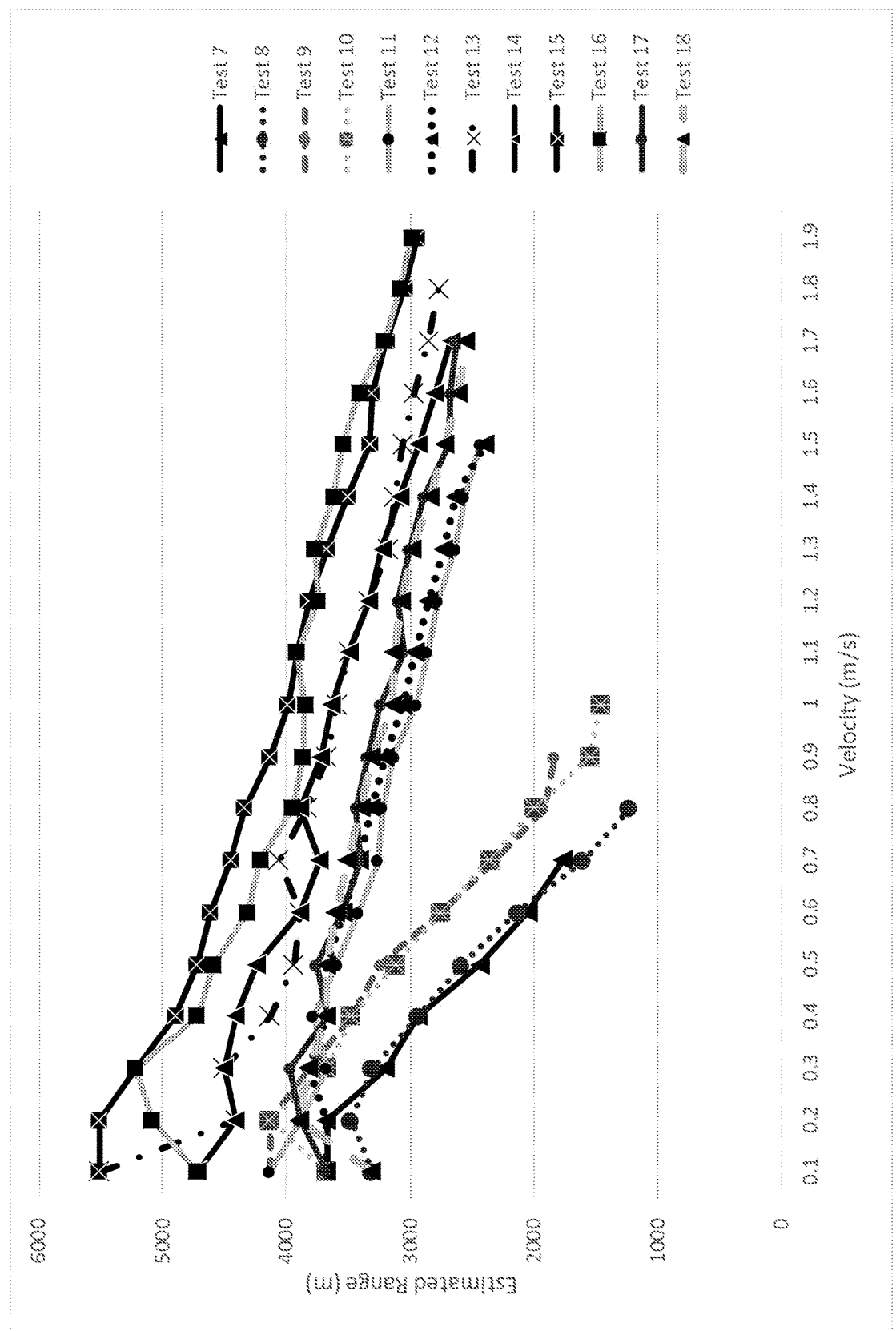
FIG. 3B illustrates a graph of estimated range as a function of velocity for several configurations of the powered mobility devices of FIG. 2C including a rotary piston pneumatic motor rated at a torque of 3200 Ncm.

Estimated range vs. velocity for devices 100 and 100' are presented in FIG. 3A for a PMO 1800 motor and in FIG. 3B for a PMO 3600 motor. All tests of the devices in climbing a 10° slope with a 100 kg user were successful with the exception of test 2 (Table 1). After analyzing each of the configurations of devices 100 and 100', the results revealed that the three-wheel configuration of device 100 with the PMO 3600 motor, gear ratio of 1:1.2, 9.53 mm tubing, and 0.827 MPa operating pressure provided the greatest range when traveling at a speed of 1.4 m/s (average human walking speed). However, dynamic stability testing of the, non-optimized three-wheel configuration of PMD 100 failed. Further optimization of such a design (for example, changes in frame 105 etc.) could be used to improve dynamic stability. However, as a result of the dynamic testing performance of PMD 100, four-wheel device 100' was used as the basis for the further design studies.

Figure 4A:
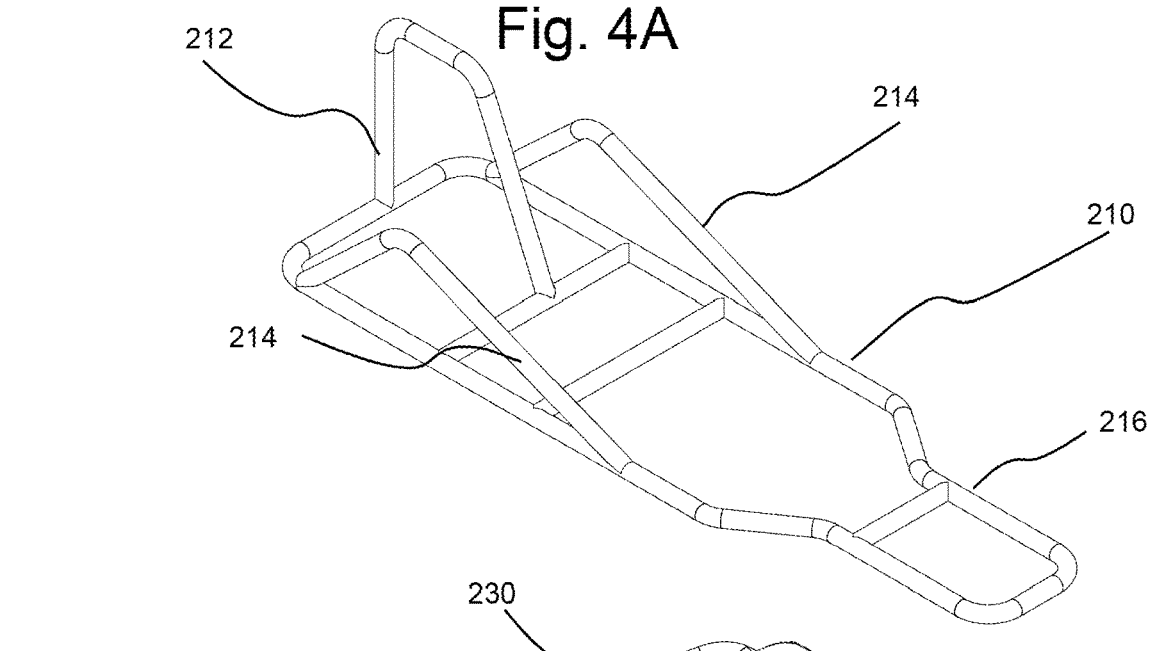
FIG. 4A illustrates a perspective view of an embodiment of a frame for another embodiment of a powered mobility devices hereof.
Figure 4B:
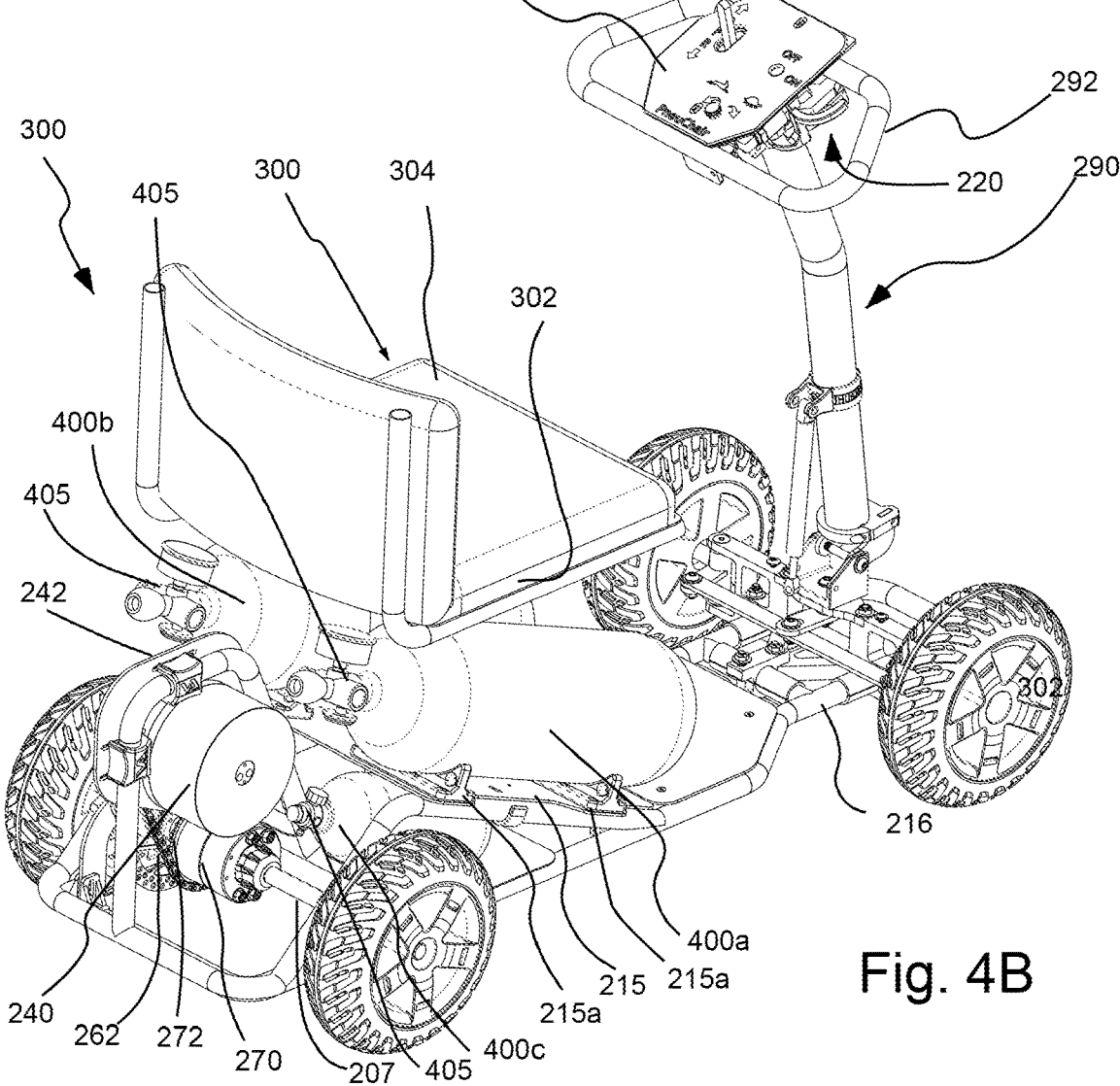
FIG. 4B illustrates a perspective view of a powered mobility device hereof including the frame of FIG. 4A.
Figure 4C:
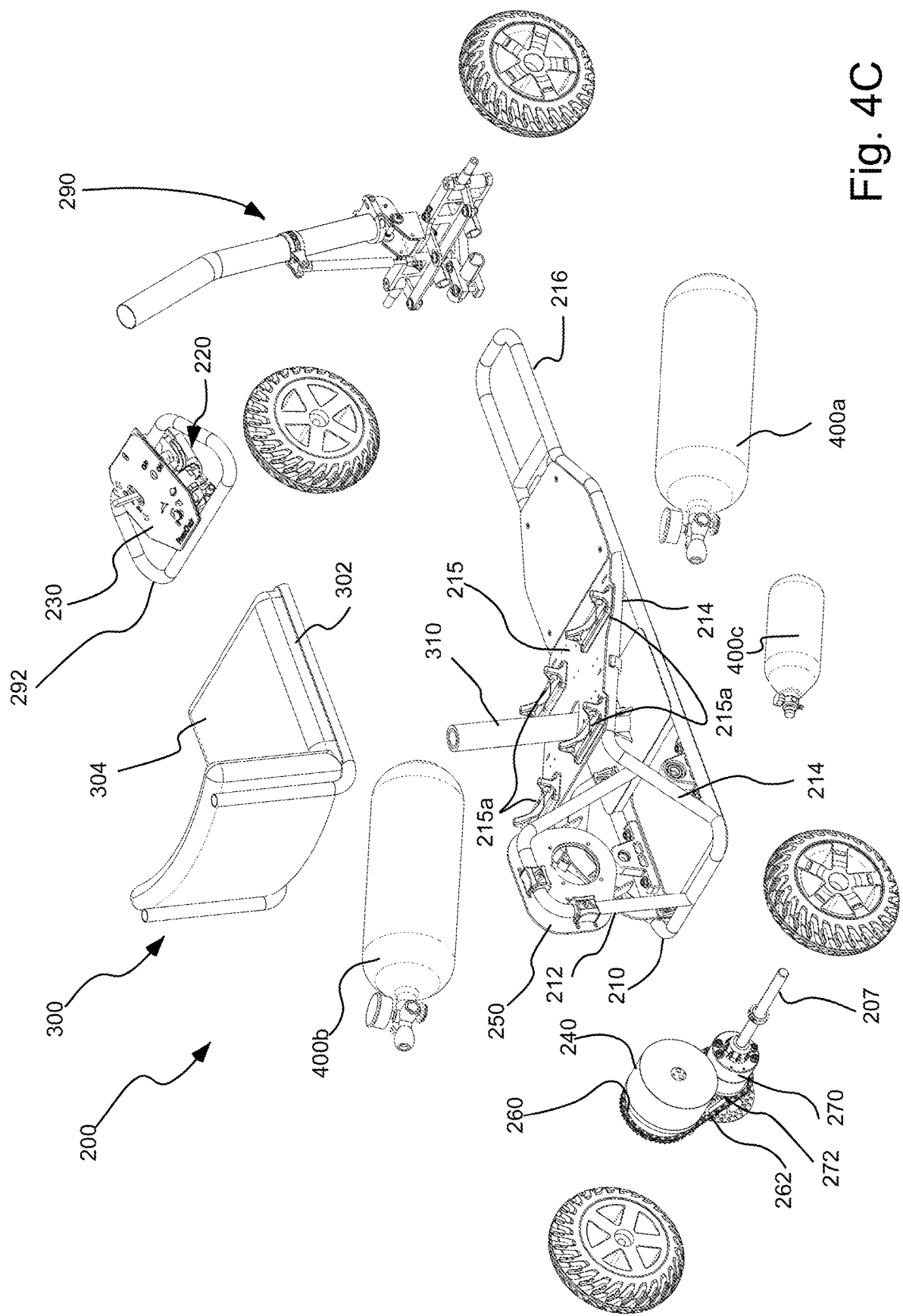
FIG. 4C illustrates an exploded, perspective view of the powered mobility device of FIG. 4B.
Figure 4D:
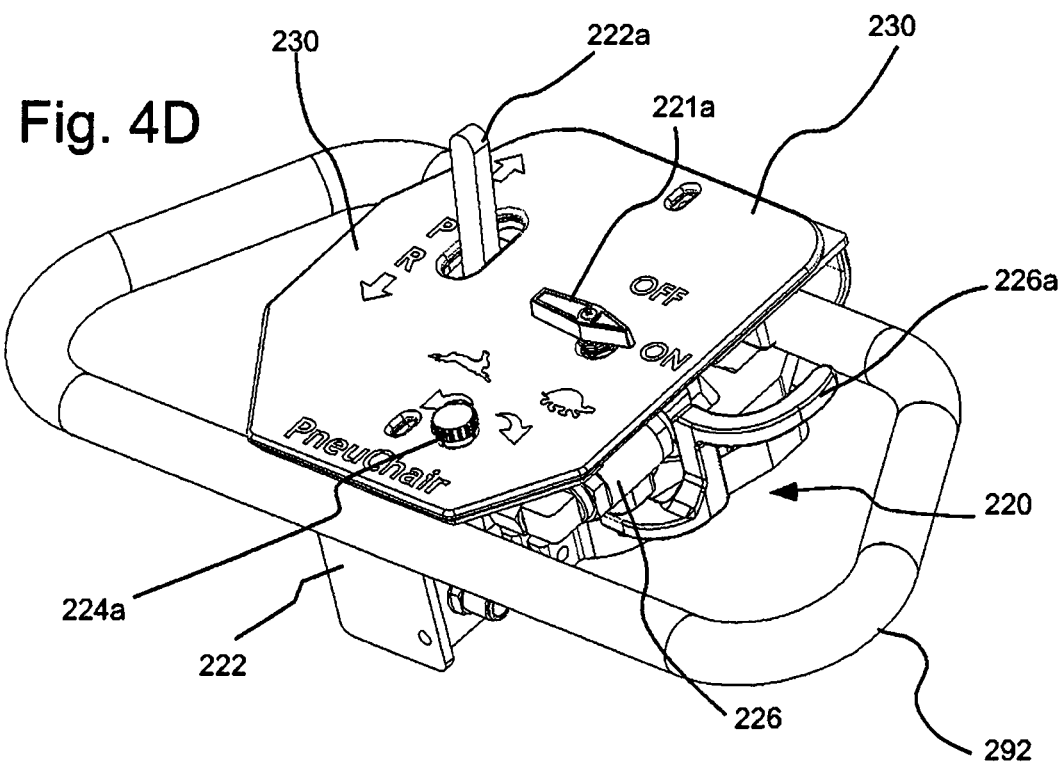
FIG. 4D illustrates a perspective view of the steering interface and the user interface of the control system of the powered mobility device of FIG. 4B.
Figure 4E:
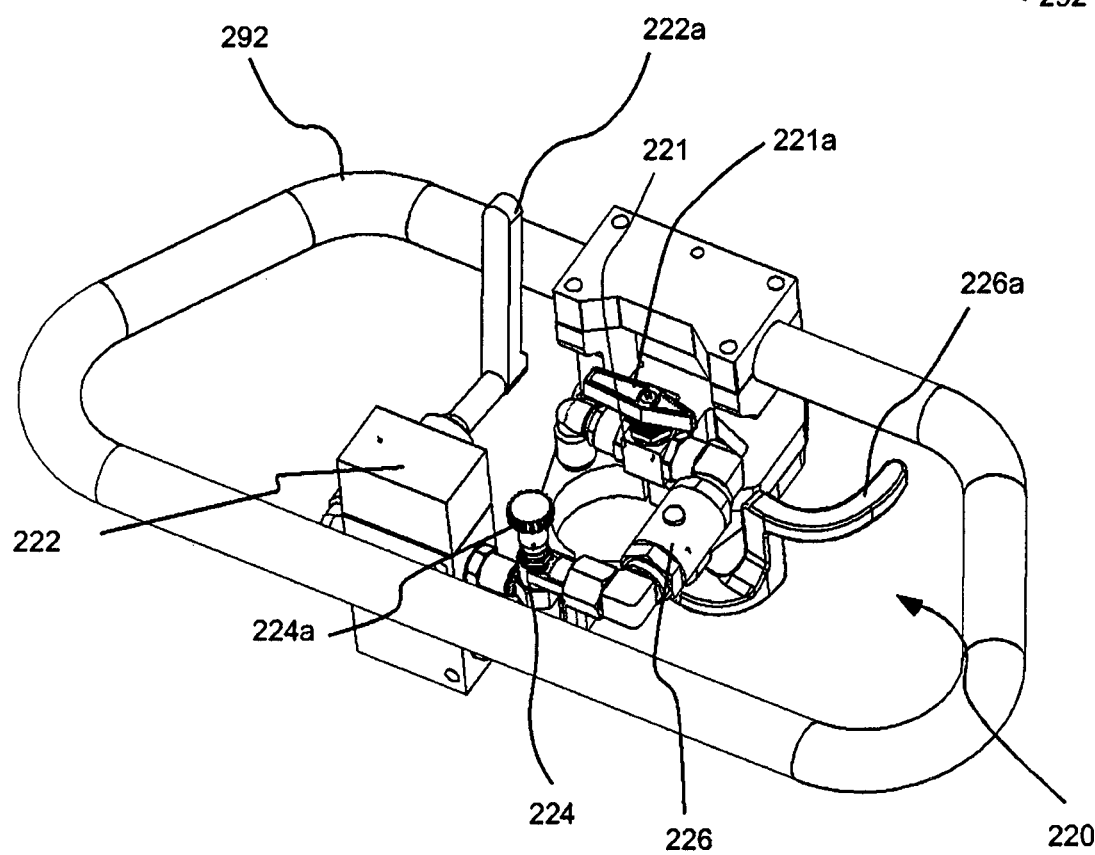
FIG. 4E illustrates a perspective view of the steering interface of the powered mobility device of FIG. 4B wherein a cover of the user interface is removed to show valves of the control system

FIG. 4A through 4C illustrates another PMD/device 200, the design of which was based in part upon the testing results from PMDs 100 and 100'. Ultimate design criteria for PMD hereof may, for example, include: 1) having a range of travel greater than five kilometers on a single charge; 2) having 20% lower weight compared to a similar electric PMD; 3) having a maximum speed of 2.7 m/s; 4) having a maximum user mass of 100 kg; 5) having interchangeable seating systems; and 6) having water resistance. PMD 200 was designed with such criteria in mind. PMD 200 included a custom, lightweight frame, a modular front steering mechanism, and no electronics.

A four-wheel mobility scooter, device or PMD 200 was designed with a custom frame 210 fabricated from 25.4 mm diameter; 1.65 mm wall thickness, 6061-T6 aluminum tubing at a mass of 2 kg (FIG. 4A). Assembled PMD 200 is illustrated in FIG. 4B, while and exploded or disassembled perspective view is illustrated in FIG. 4C. Frame 210 includes a generally U-shaped motor support 212 at a rearward end thereof to which motor 240 is attached via a motor plate 242 to drive rear wheels. Frame 210 further includes angled, v-shaped tank supports 214 for supporting pressurized gas/air tanks 400a and 400b at an angle as illustrated in FIGS. 4B and 4C. In the illustrated embodiment, a support panel 215 including tank mounting brackets 215a is operatively connected tank supports 214.

A modular steering assembly 290 including a steering interface or steering wheel 292 is attachable to a forward section 216 of frame 210. Modular steering assembly 290 provides for simplified maintenance. As illustrated, for example, in FIGS. 4D and 4E control system 220 included an on-off valve 221 having a switch or knob 221a in operative connection therewith to turn the drive system of PMD 200 on/off. A directional control valve 222 having a control lever 222a in operative connection therewith operated as a "gearshift" to allow the user to place the device in forward, reverse or park. A flow control valve 224 having a knob 224a in operative connection therewith operated as a speed control for PMD 200 and allowed for relatively precise control of the airflow to pneumatic motor 240 to control the motor speed. Control system 220 further included a butterfly valve 226 having a lever in operative control therewith to operate as a throttle. Line tubing (not shown) was used to provide connection between tanks 400a, 400b, 400c, control system 220, and a pneumatic motor 140. Tanks 400a, 400b, 400c may, for example, be provided with one or more regulators 405 to reduce pressure to operating pressure for motor(s) 240 (for example 0.2 MPa (2 bar or 29 psi) to 0.8 MPa (8 bar or 116 psi) in a number of studied embodiments).

An easily removable seat assembly 300 attached to frame 210 via an extending member 310 (see FIG. 4C) attached to a base 302 of seat 304 of seat assembly 300. Removable seat assembly 300 allows for multiple seat types to be readily incorporated within PMD 200.

Similar to PDM 100', a sprocket or gear 260 was secured to and rotated about the end of the output or drive shaft of motor 240. Sprocket or gear 260 (see FIG. 4C) was operatively connected to a gear or sprocket 272 of a differential 270 on a rear axle 207 of PDM 200 via a drive chain 262. The differential axle was mounted to frame 210 via pillow blocks and secured in place with shaft collars. The gear ratio used between motor 240 and differential 270 was variable as described above in connection with PDM 100'.

An easily accessible charge port (not shown) was provided in fluid connection with each of tank 400a, tank 400b and tank 400c to recharge all of the tanks at once. The overall mass of PMD 200 was 59.4 kg, 28.4% lighter than an equivalent electric power scooter.

Range testing of PMD 200 was performed by driving PMD 200 around an indoor, rectangular track as described in ISO Standard 7176. Testing started with PDM 200 traveling at a velocity of 1.35 m/s and stopped once the velocity dropped below 0.5 m/s. Device 200 was driven around the track in either the clockwise or counterclockwise direction for five laps. The direction of travel was then reversed for another five laps. This process was repeated until the minimum threshold velocity was reached. Three different testing configurations were tested. Each configuration was tested three times to calculate an average. The different testing configurations includes one 9 L tank (a standard size tank for use in scuba), two 9 L tanks (for a total of 18 L), and two 9 L tanks with the addition of a 1.44 L tank (a standard size tank for use in paintball; for a total of 19.44 L) as an expansion chamber. The slope climbing capability of PMD 200 was tested under two conditions: (1) approaching a 10° slope at a velocity of 1.35 m/s, and (2) starting from a stopped position at the bottom of the slope. The velocity of the prototype had to be a minimum of 0.5 m/s after traveling 10 m up the slope to pass the test.

The results of the range testing for PDM 200 revealed that the studied embodiment of PMD 200 could travel an average of 1267 m using one 9 L tank, 2762 m using two 9 L tanks (a total of 18 L), and 3150 m using two 9 L tanks and a 1.44 L tank (a total of 19.44 L) as an expansion chamber at an ambient temperature of 21° C. Results from the slope climbing tests showed that PMD 200 passed both scenarios when using the best configuration of components determined from testing device 100'. An additional attempt was made after increasing the gear ratio to 1:1.4 but PMD 200 was unable to pass either slope testing conditions. As a result, the prototype's gear ratio for PMD 200 was set to 1:1.2.

Figure 5:
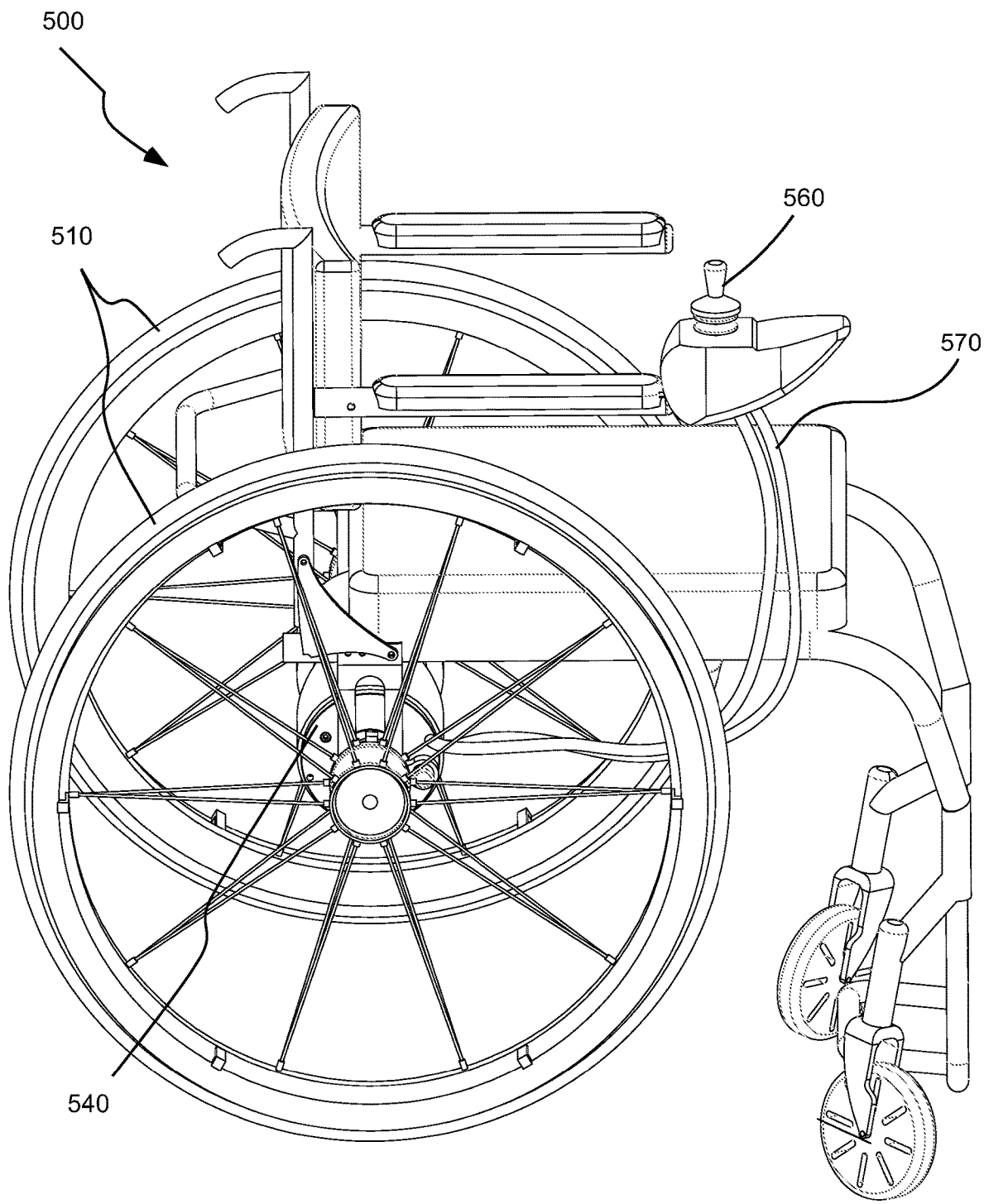
FIG. 5 illustrates a perspective view of another embodiment of a powered mobility device hereof wherein a manual wheelchair is retrofitted with a pneumatic drive system hereof.

Another embodiment of a PMD 500 including a pneumatic drive system hereof is illustrated in FIG. 5. PMD 500 included a pneumatic drive system including two pneumatic radial piston motors 540. Each of motors 540 (only one motor 540 is visible in the view of FIG. 5) was place in direct operative connection with one of the rear wheels 510 of PMD 500. The pneumatic drive system PMD 500 may further include a passive linear pneumatic joystick 560 as a control in operative connection with motor 540 and on or more pressurized gas tanks (not shown) via tubing 570. In the embodiment of FIG. 5, the pneumatic drive system was installed on (or retrofitted upon) a simple manual wheelchair. Although a simple chair may not be an appropriate chair for many PMD users, it provides a very low cost model for demonstrating pneumatic drive systems hereof and demonstrates retrofitting of a manual wheelchair to include a pneumatic drive system. In one tested embodiment, the mass of the wheelchair 500 was 20 kg when configured with motors 540 and joystick 560. The illustrated configuration does not include a high-pressure air storage tank. With the two 40 watt radial piston air motors, the test wheelchair consumed 7000 L of air to drive 15 km. At that consumption rate, the chair would have been able to travel 1.3 km on a 2.0 L bottle filled with compressed air at 31 MPa (310 bar or 4500 psi).

Figure 6A:
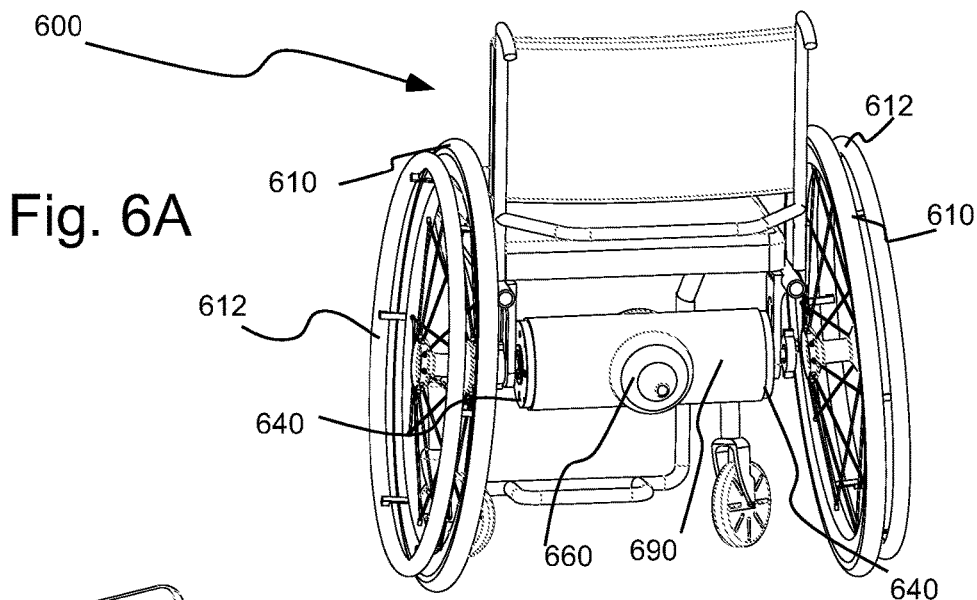
FIG. 6A illustrates a rear perspective view of an embodiment of a powered assisted mobility device hereof.
Figure 6B:
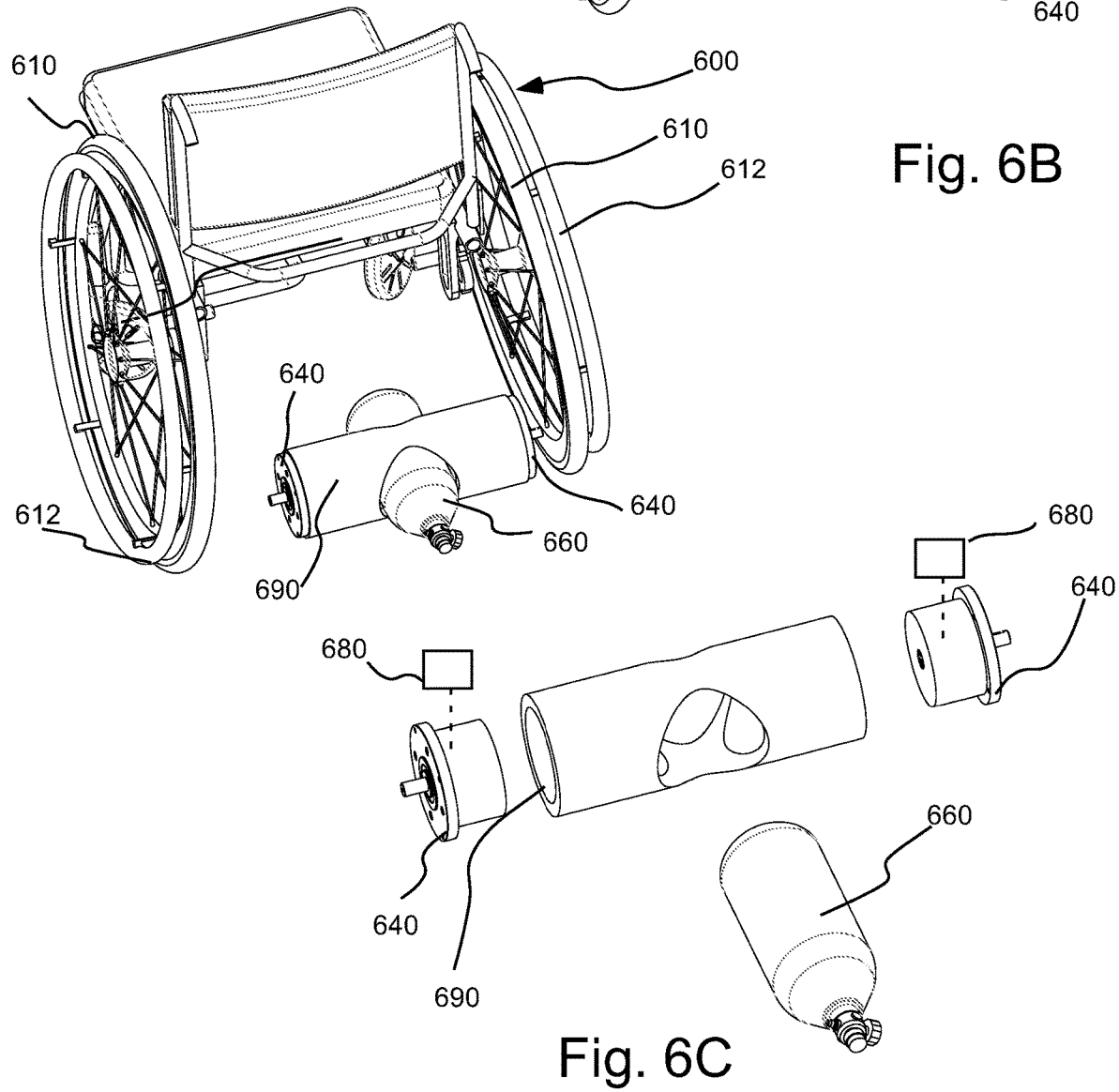
FIG. 6B illustrates another rear perspective view of the powered assisted mobility device of FIG. 6A with the pneumatic drive system removed from connection therewith.
Figure 6C:
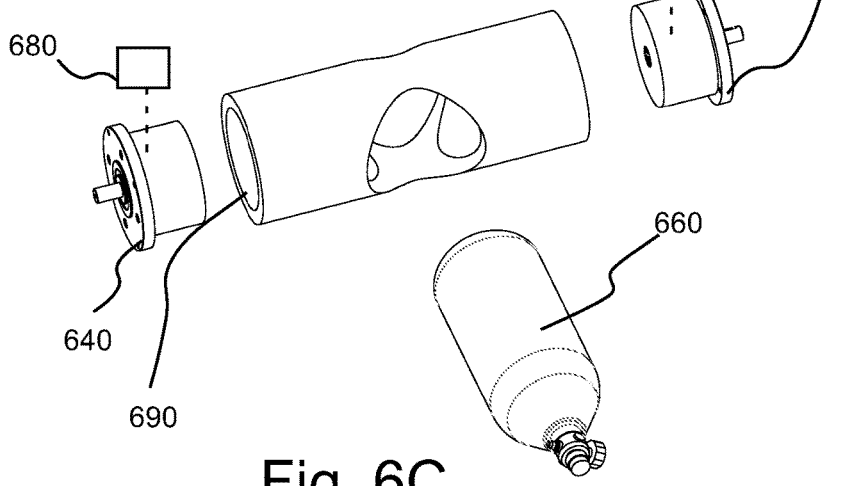
FIG. 6C illustrates a perspective view of the pneumatic drive system of the powered assisted mobility device of FIG. 6A.

FIGS. 6A through 6C illustrates an embodiment of a PMD 600 hereof which may, for example, be a pushrim-activated power-assist wheelchair (PAPAW) in which manual power is augmented by the pneumatic drive system. Wheelchair 600 includes rear wheels 610 with pushrims or handrims 612 to facilitate manual application of power. A pneumatic motor 640 such as a rotary piston pneumatic motor is provided in direct connection with each of wheels 610. In the illustrated embodiment, pneumatic motors 640 and a high-pressure gas storage tank 660 are operative mounted in a power assist mount 690 which can be placed in operative connection with wheels 610 of wheelchair 600. A pushrim or handrim activated control valve system 680 is illustrated schematically in FIG. 6C in operative connection with each pneumatic motor. Valve system 680 may be triggered by propelling of pushrims 512 (or wheels 610) or by a change in driving terrains (for example, slopes). Valve system 680 may, for example, be controlled by an acceleration sensitive system such as an inverted pendulum system. When a user applies force on pushrim 612 to accelerate forward, such an inverted pendulum will move backward to switch valve system 680 for positive torque assistance. When the user holds pushrim 612 to slow down or stop, the inverted pendulum will move backward to, for example, switch valve system 680 for negative torque to assist with braking. At constant speed or in the absence of significant positive or negative acceleration, the inverted pendulum will stay in the middle neutral zone, which closes valve system 680 during these conditions (that is, when no powered assistance is needed). When on slopes, valve system 680 may automatically switch to positive assistance going up slopes and to negative assistance for going down slopes. The level of assistance provided may be adjusted by the air flow using a valve on the air tank 660. Power assist wheelchairs provide a bridge between arm propulsion and motorization. Power assist offers a helpful and medically necessary alternative that can promote or maintain health and improve mobility.

Figure 7A:
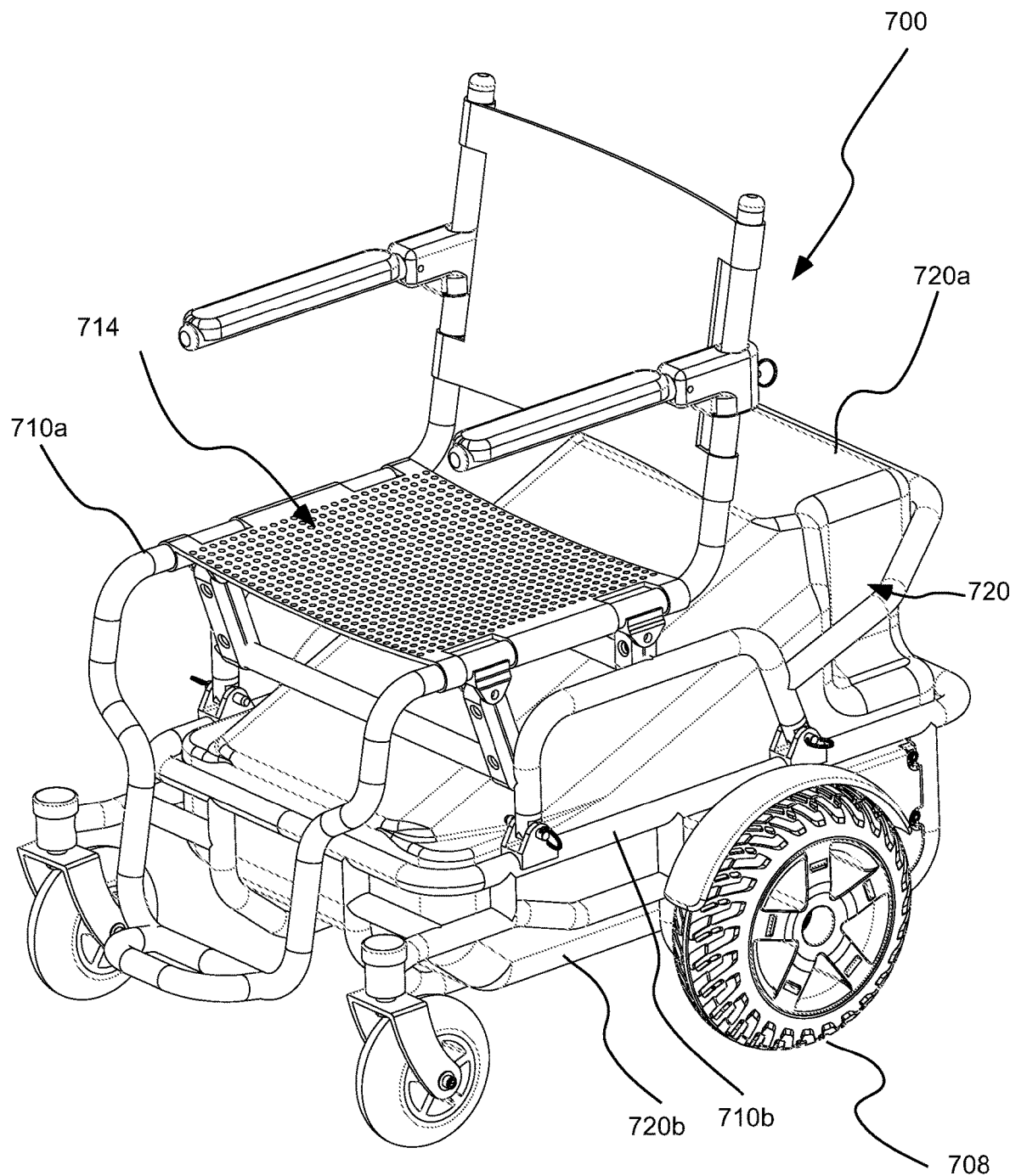
FIG. 7A illustrates a perspective view of another embodiment of a pneumatic power mobility device suitable, for example, for use in a water park or pool).
Figure 7B:
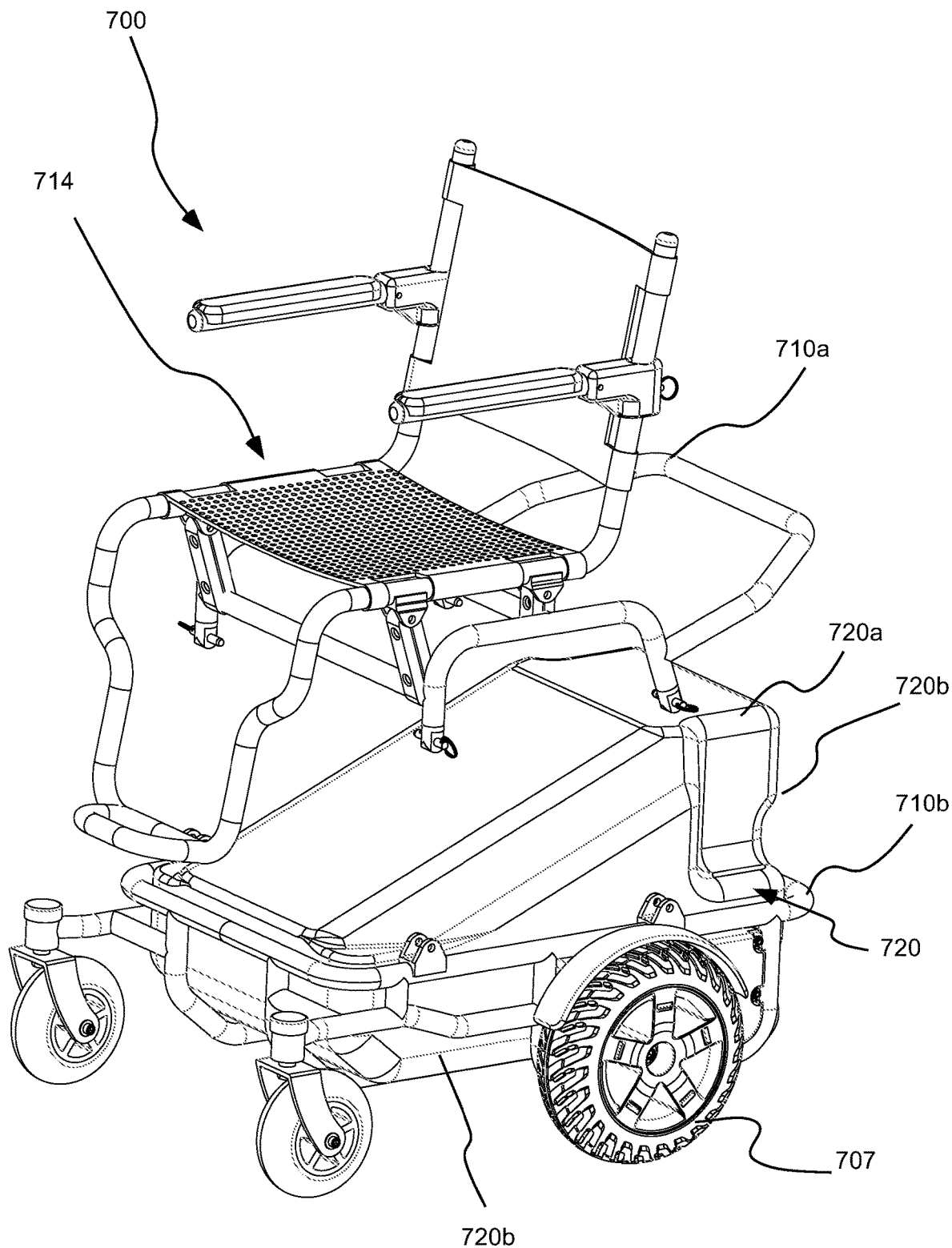
FIG. 7B illustrates a perspective, partially exploded view of the PMD of FIG. 7A.
Figure 7C:
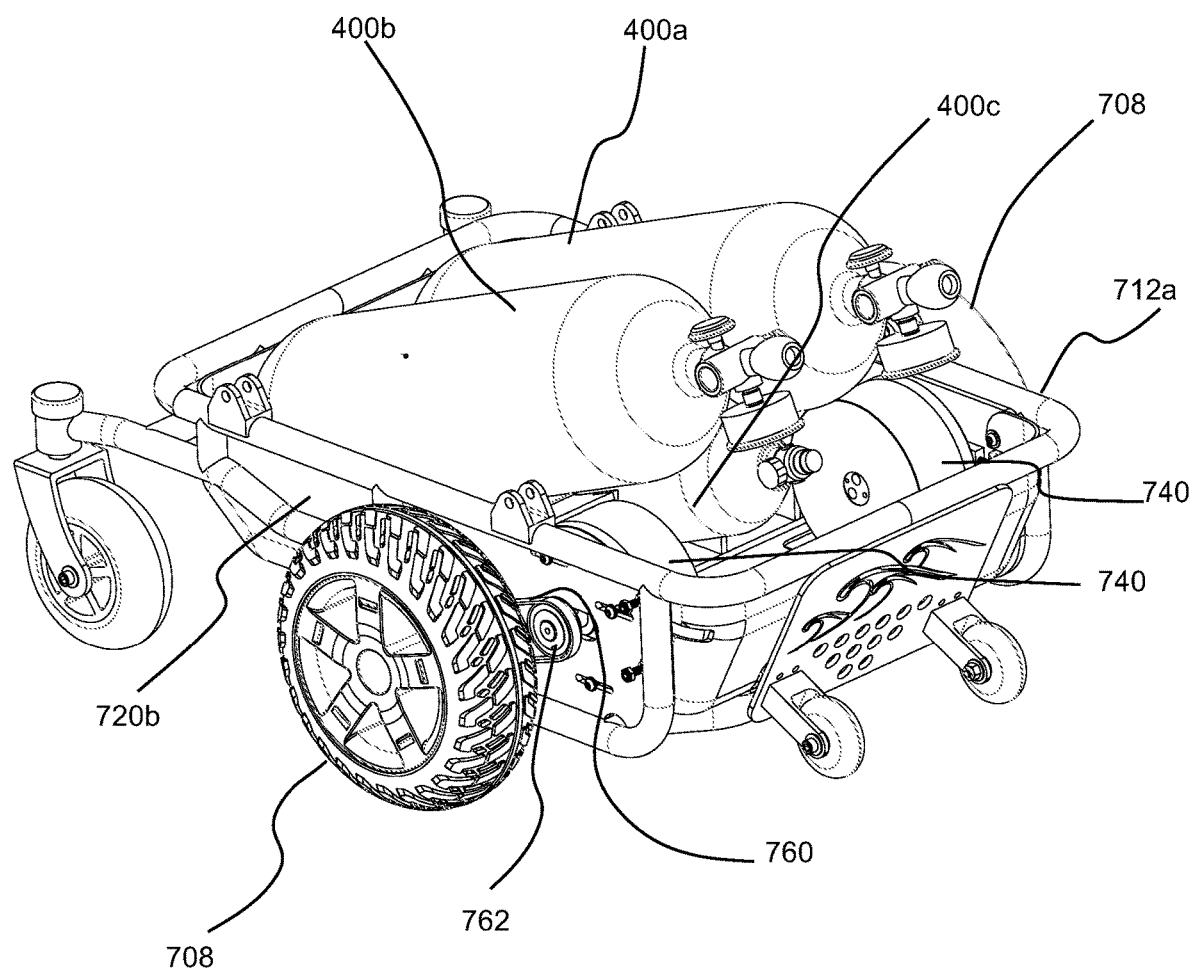
FIG. 7C illustrates a perspective view of a lower portion of the PMD of FIG. 7A wherein an upper section of a containment module has been removed to show, for example, the pressurized gas tanks and the pneumatic motors of the PMD.

FIGS. 7A through 7C illustrate another embodiment of a PMD 700 hereof that was developed for use in wet environments such as pools or water parks. PMD 700 includes an upper frame portion 710a and a lower frame portion 710b. Upper frame portion 710a provides support for seat 714, while lower frame portion 710b provides support for a containment module 720, including an upper section 720a and a lower section 720b, which encompasses pressurized tanks 400a, 400b and 400c as described above, as well as pneumatic motors 740 and other components of PMD 700. A control system similar in overall functionality that those described above may, for example, be provided. Stainless steel hardware may, for example, be used to provide water resistance. Pneumatic motor 740 may, for example, be coupled to rear driving wheels 708 via a belt and pulley system including a pulley 760 in operative connection with the output or drive shaft of motor 740 and a belt 762, which operatively connect to another pulley (not shown) in operative connection with the axle for rear driving wheels 708. A belt and pulley system may, for example, be preferred in wet environments because such a system does not require lubrication.

The design and testing of the PMDs hereof demonstrate that pneumatic technology is a viable replacement for electric powered mobility devices in both fully powered mobility devices as well as power assisted mobility devices. The advantages of pneumatic technology solve many of the longstanding major issues experienced with electric PMD and can decrease the overall lifetime costs of the device. Based on Medicaid and Medicare's replacement guidelines, PMD are expected to have at least a five-year lifetime. A major issue or problem with electric PMD is the frequency that repairs are needed. One study conducted a survey that included power wheelchair users found that of the 239 power wheelchair participants, 65.6% (157/239) needed at least one repair within the six-month period prior to participation in the study. In the study, 49.0% (77/157) of the 65.6% experienced greater than one adverse consequence of which 24.2% (38/157) of the individuals were left stranded. The study also found that the most frequent repairs for power wheelchairs were to the electrical, power, and control systems. When repairs are needed to these systems, they are typically performed by a mobility device supplier, which can be a lengthy process. Unlike electric PMD that experience power issues, many of the components of a pneumatic powered PMD are widely available and affordable, and can be fixed by anyone who is technically skilled. Moreover, such components are designed for years of use with little maintenance. These characteristics decrease the possibility of the user being without a PMD for a long period of time.

Concerns when using pneumatic systems include noise and safety. The noise of a pneumatic system is generated when the air is exhausted out of the pneumatic motor. Typical pneumatic motors have noise levels that average 77 dB. These levels increase with speed and are greatest when under no load. The BIBUS pneumatic radial piston motor used in a number of devices hereof have a noise level of about 60 dB. This noise level is similar to that of a pair of electrical powered wheelchair motors which operate at 58 dB. These levels can be further decreased with the addition of a noise reduction system such as a muffler system. In terms of safety, pneumatic components use no hazardous materials and meet both explosion protection and machine safety requirements because they do not generate magnetic interference.

The high-pressure air or HPA PMD hereof may be "charged" (air tanks filled) via an air compressor that is capable of filling the tanks up to a pressure of, for example, 31 MPa (310 bar or 4500 psi). Preferably, tank of PMD hereof are charge to at least 17.2 MPa (172 bar or 2500 psi). A compressor may be connected to the PMD via a quick disconnect connection, as known in the gas transfer arts, and in a manner similar to how electric PMD are plugged in to an outlet to charge. The length of time required for a full charge of PMD hereof is based on the method of recharging. One method is to have a "filling station" that includes of a large storage tank in operative connection with a compressor that constantly maintains the storage tank pressures at, for example, 31 MPa. In this method, filling the tanks is as simple as connecting the PMD to the storage tank and opening a couple valves to allow air to transfer from the storage tank to the tanks on the PMD. This method takes less than one minute to fill the tanks from an empty state. A second method is similar to the first method but with the absence of the storage tank. The PMD would be connected directly to the compressor as described above. The charge time for this method depends on the size of the compressor. For example, a high pressure compressor such as the Bauer JUNIOR II™ compressor available from Bauer Compressors, Inc. of Norfolk, Va. has an air flow rate of 100 L/minute. At that rate, it takes approximately 90-120 minutes to completely fill all three tanks from empty to a pressure of 31 MPa. A third method includes having one large or a number of small tanks that are filled to 31 MPa. These tanks operate similarly to the storage tank described in the first method. The PMD could simply be connected to the tank (s) to recharge. To refill the storage tank(s), a mobile air compressor unit may be used or a "bottle service" may be used (that is, a service which picks up empty tank(s) and replaces them with filled tanks). The number of recharges available would be dependent on the size and number of storage tanks. Charging time for this method would be similar to method one (that is, under one minute).

Of the three methods described above, the second and third methods are better suited for in-home charging as a result of their small footprint. For users that need quicker recharges and require multiple recharges throughout the day (for example, as a result of traveling longer distances), the third method may best suit their needs. However, for users who do not travel long distances during the day and only need to recharge a PMD once per day, the second method may be more suitable. Unlike the second and third methods, the first method operates more like a fueling station for vehicles. The filling station of the first method has the capability to recharge numerous devices in a short amount of time. Situations in which the first method may beneficial include, for example, commercial and healthcare facility settings such as airports, shopping malls, amusement parks, hospitals, nursing homes, etc.

PMD typically have a small wheelbase to allow them to fit through doors and be maneuverable indoors. As a result, the size of the pressurized gas tanks is limited. To achieve an extended range, pressurized gas tanks such as HPA tanks similar to those used by firefighters and scuba divers may be used because of their size and safety record. HPA tanks have the capability to be filled up to 31 MPa. Compressor typically found at a local hardware store are not capable of reaching such pressures. However, suitable, high-pressure compressors are commonly available at sporting goods stores that, for example, charge paint-ball tanks, at dive shops, and at fire or emergency medicine technician stations. Air compressors that meet the necessary specifications to fill HPA tanks to 31 MPa typically cost between $250 and $1500 and can be operated for up to 10 years or more with little or no maintenance. HPA tanks cost from $50 to a few hundreds of dollars and are required to be hydro-tested and recertified every 3-5 years at a cost of approximately $20 per tank.

When filling HPA tanks to pressures up to 31 MPa, power consumption versus pressure has a linear relationship. The potential energy of 9 L of air at 20 MPa is 953.7 kJ and at 31 MPa is 1600 kJ. Using the Bauer JUNIOR II compressor with a 2.2 kW motor, the energy consumption to fill a 9 L tank to a pressure of 20 MPa is 2340 kJ in a completion time of 17.75 minutes (0.3 hours), while filling a tank to 31 MPa requires 3960 kJ and a completion time of 30 minutes (0.5 hours). The resulting efficiency of the Bauer JUNIOR II compressor is approximately 41% when filled to either pressure. The energy consumption when charging electric PMD can be as high as 10,370 kJ when considering the maximum charge time of eight hours using a 120 V charger operating at 3 A. When comparing the energy consumption between electric and pneumatic systems, a pneumatic system can be recharged 2.2 more times when filling the system to 30 MPa and 1.3 more times when filling the system to 31 MPa.

The use of pressurized fluid tanks such as high-pressure-air (HPA) tanks (approximately, $100-$150) instead of batteries ($300-$550) may decrease the overall cost of a PMD by, for example, as much as 60%. Additionally, the cost of pneumatic motors as compared to electric motors further decrease costs. Another significant cost associated with batteries is the cost of disposal of the electric batteries when they are no longer operational. Conventional, battery-powered electric drive system also require careful environmental attention when the system is no longer operational. Specifically, the batteries may present an environmental concern. Annual disposal of electric wheelchair batteries presents both a cost and hazardous waste issue. On the other hand, pneumatic systems reduce environmental impact and pose no environmental threats at the time of disposal. Pneumatic tanks may be refilled throughout the life of the PMD.

Pneumatic systems provide lower maintenance requirements as compared to battery/electric powered systems. As described above, batteries used in the conventional electric drive systems have a limited number of recharging cycles. Moreover, such systems require a routine to discharge and recharge the batteries for the batteries to maintain optimal charge/usage characteristics. A pneumatic system, however, can be discharged and recharged an unlimited number of times. Once again, unlike batteries, frequent replacement of the tanks is not required. Indeed, the lifetime of the tank will likely exceed the lifetime of the PMD.

The range of PMD powered by compressed air or other gas is based on the pressure, volume, and temperature of stored gas on the PMD. Air volume can be increased by either increasing the pressure inside the air tank, raising the temperature (for example, through an expansion chamber) or by increasing the tank size. Potentially, an expansion chamber or gas lines (for example, incorporated into the seat of the PMD) may be used to cool the person's body temperature, while heating the gas to increase range. Lower skin temperatures may, for example, reduce the risk of pressure ulcers.

The average electrical PMD battery will last six months to one year. Battery lifetimes are based on numerous factors including battery size/type, charging frequency, level of daily discharge, and daily usage. The range of travel electric PMD is variable based on the terrain traversed and driver habits. Traveling up slopes and travelling at higher speeds tend to decrease the range of a PMD. Therefore, a majority of the batteries of an electrically powered PMD will need to be replaced a minimum of five to six times over the expected lifetime of the device. The cost of battery replacements can range from $100-$500 each time a replacement is necessary depending on the type of PMD Thus, pneumatic technology may result in a savings of approximately $500-$2500 when considering battery replacement alone.

Pneumatic systems have the potential to provide rapid nearly unlimited recharging, lighter weight, lower operating cost, and smaller environmental impact. With the growing availability of lightweight, portable HPA tanks, a pneumatic drive system may strengthen individual independence and mobility as well as lower healthcare and institutional costs. Additionally, efficient pneumatic motors such as rotary piston pneumatic motors increase the practicality of high pressure gas as a practical alternative to electric power for PMD.

Pneumatic systems are also well suited for usage in PMD because of their resilience to environmental hazards such as dirt, heat, and moisture. Environments wherein pneumatic powered systems have a clear advantage over electric powered systems include environments with the presence of water or moisture and environments wherein there are fire/explosion risks (for example, oxygen-rich environments). Unlike battery-powered drive systems, there is no risk of fire, electrical shock or electromagnetic compatibility issues with pneumatic drive systems. Pneumatic and compressed gas systems require very little maintenance and may be driven through water, snow, moisture without difficulty. Robust operating characteristics are very desirable as most wheelchairs receive little or no preventative maintenance. Pneumatic powered PMD have the potential to provide avenues for independent mobility on beaches, in amusement/water-parks, and other areas where the PMD may be exposed to a very wet environment. Moreover, in environments with high relative humidity, a pneumatic powered PMD will have greater reliability and longevity than an electric powered PMD. Such environmental resilience may be an important contribution to powered mobility in rural or less-resourced areas. Pneumatic driven PMD may support community integration by increasing reliability and availability of the PMD, and promote participation in many activities of daily living through improved transportability (for example, as a result of pneumatic powered PMD being lighter in weight that electric powered PMD).

The relatively light weight of pneumatically-powered PMD eases transport concerns in motor vehicles and other transport systems, which is a significant challenge for electric powered mobility devices. Moreover, air and other travel may be easier as the compressed gas/air may be drained during flight/transport, and recharged upon arrival, thereby eliminating the need to remove and package batteries for flight.

Pneumatic drive systems may provide further advantages in rural areas, developing countries and other resource-limited areas. Once again, compressed gas such as compressed air requires only, for example, a compressor and a storage tank. Unlike battery-powered systems, a regular and reliable source of electricity is not required. In areas with reduced infrastructure or resources, locating a source of reliable and clean electric power is often a challenge. Compressed gas can, for example, be stored during times when electric power is cheap and/or available. Further, gasoline, diesel, solar, and hydro powered compressors can be used to produce compressed gas/air. Because of the quick charging rate associated with a pneumatic drive system, an area (for example, a remote village) may have a single pneumatic or compressed gas stowage station.

Pneumatic drive systems are also more infrastructure friendly than battery powered systems. For example, in the case of fleet electric powered mobility devices, multiple wall outlets are required and may undergo significant wear and tear with the use of battery chargers. Pneumatic systems may require, for example, only one compressor and a high-pressure storage tank (instead of multiple battery chargers). Pressurized gas/air hardware is much more robust than residential and retail electrical outlet construction. Only one outlet is required for the compressor, and the plug would not need to be removed frequently.

Moreover, use of pneumatic drive systems in a fleet of PMDs (for example, as used in a store/mall complex, airport or a park) may reduce the number of vehicles required in the fleet, thereby reducing storage space, maintenance costs and other costs/requirements associated with maintaining a large fleet. In that regard, because 5 to 8 hours of charging time is often associated with battery-powered fleets, a large percentage of a battery-powered fleet (for example, 50%) may be unavailable for use. The quick recharge time of a pneumatic drive system may thus significantly reduce the number of vehicles required in a fleet.

Pneumatic power and electric power may be readily combined in a PMD to take advantage of the strengths of each system. For example, one may include electric power (via limited battery energy) in a pneumatically powered PMD to add power seat functions, to incorporate computer control or to provide more complex user interfaces.

Pneumatic motors inherently provide high-torque at low-speeds and are naturally compliant. PMD driving is a low-speed and frequent start/stop driving task. PMD are thus well suited for pneumatic/compressed gas drive systems. Further, wheelchair users must drive indoors and in close proximity to people. This often results in purposeful (e.g., opening a door) or inadvertent contact (e.g., hitting a wall). Pneumatic drive systems are naturally compliant, reducing risk of harm to people, the surrounding environment, and the mobility device.

As described in a number of representative examples hereof, pneumatic drive system may be readily incorporated or retrofitted into electric/battery powered PMD as well as manual wheelchairs (for example, to augment or replace the arm power of the manual wheelchair user). Pneumatic drive systems are well suited in this application as weight is critical for manual wheelchair users. Furthermore, the propulsion may be intermediate and low power. The natural compliance of compressed gas systems may also help with the coupling with the person and the pneumatic motor.

Pneumatic drive systems in connection with PMDs are thus superior to battery operated drive systems in many respects. Once again, pneumatic drive systems have the potential to provide quick, nearly unlimited recharging, lighter weight, lower cost, and smaller environmental impact. Further, pneumatic drive systems could strengthen individual independence and mobility. PMDs with pneumatic drive systems have potential to revolutionize powered mobility, and replace many of the scooters and electric powered wheelchairs in use today, especially for scooters and Medicare coded Group 1 electric powered wheelchairs.

Pneumatic motors such as affordable, small, low-speed, high-torque, efficient rotary pneumatic motors are readily adapted for use in PMD. For example, modem radial piston gas motors (available, for example, from Bibus AG and from Deprag Schulz GMBH u. Co. of Amberg, Germany), turn gas pressure into torque, and are low-speed, high-torque drives. Pneumatics have significant advantages over electric powered motors including, but not limited to, good compliance, high torque to weight, high torque to volume, low inertia for fast cycling, safe dissipation of heat, shock and explosion proof, ease of maintenance, ability to withstanding overloading and continuous stalling, and a wide variety of transmission methods. As described above, pneumatics are also resilient to environmental hazards such as dirt, heat, water and moisture. Further, small high-pressure gas cylinders (for example, $CO_2$ and air) suitable for use in PMD hereof are readily available from a wide variety of sources.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A personal mobility wheelchair or scooter comprising:
   a frame;
   a plurality of wheels attached to the frame;
   one or more rotary piston pneumatic motors, each of the one or more rotary piston pneumatic motors having a drive shaft in operative connection with at least one of the plurality of wheels, wherein the at least one of the one or more rotary piston pneumatic motors is in operative connection with the at least one of the plurality of wheels via a gear system comprising a first gear in operative connection with the drive shaft of the at least one of the one or more rotary piston pneumatic motors and a second gear in operative connection with an axle about which the at least one of the plurality of wheel rotates, the gear system having a conversion ratio in the range of 1.5:1.0 to 1.0:1.5, and wherein the second gear is in operative connection with a differential;
   at least one tank for storage of a pressurized gas in operative connection with the one or more rotary piston pneumatic motors to supply the pressurized gas to the one or more rotary piston pneumatic motors; and a control system in operative connection with the at least one tank and with the one or more rotary piston pneumatic motors, the control system comprising a flow control valve in fluid connection with the at least one tank and the one or more rotary piston pneumatic motors to provide a maximum velocity of 2.7 m/s for the personal mobility wheelchair or a scooter, wherein a cumulative maximum torque for the one or more rotary piston pneumatic motors is at least 16 Nm.

2. The personal mobility wheelchair or scooter of claim 1 wherein the cumulative maximum torque for the one or more rotary piston pneumatic motors is at least 32 Nm.

3. The personal mobility wheelchair or scooter of claim 1 wherein the cumulative maximum torque for the one or more rotary piston pneumatic motors is at least 64 Nm.

4. The personal mobility wheelchair or scooter of claim 1 further comprising a plurality of tanks for storage of the pressurized gas connected in series and having a pressure of at least 17.2 MPa in operative connection with the one or more rotary piston pneumatic motors.

5. The personal mobility wheelchair or scooter of claim 4 wherein the plurality of tanks stores the pressurized gas at a pressure of at least 31 MPa.

6. The personal mobility wheelchair or scooter of claim 1 wherein a maximum rotation speed of the drive shafts of the one or more rotary piston pneumatic motors is less than 1000 rpm.

7. The personal mobility wheelchair or scooter of claim 1 wherein a maximum rotation speed of the drive shafts of the one or more rotary piston pneumatic motors is less than 600 rpm.

8. The personal mobility wheelchair or scooter of claim 1 wherein the differential is a limited slip differential.

9. The personal mobility wheelchair or scooter of claim 1 wherein the at least one of the plurality of wheels is positioned at a rear of the frame.

10. The personal mobility wheelchair or scooter of claim 1 wherein the personal mobility device is a wheelchair or a scooter.

11. The personal mobility wheelchair or scooter of claim 1 wherein the personal mobility device is a power assisted wheelchair and at least one of the plurality of wheels is further powerable under manual power.

12. The personal mobility wheelchair or scooter of claim 11 wherein the control system comprises an activatable valve control which is activated by at least one of an acceleration threshold or an inclination threshold in operative connection with the at least one of the plurality of wheels.

13. The personal mobility wheelchair or scooter of claim 1 wherein the control system comprises a directional control valve.

14. The personal mobility wheelchair or scooter of claim 1 wherein an operating pressure of the pressurized gas supplied to the one or more rotary piston pneumatic motors is in a range of 0.34 MPa (50 psi) to 1.03 (150 psi).

15. A method of providing powered drive to a personal mobility wheelchair or scooter including a frame and a plurality of wheels attached to the frame, comprising:

providing one or more rotary piston pneumatic motors, each of the one or more rotary piston pneumatic motors having a drive shaft in operative connection with at least one of the plurality of wheels, wherein the at least one of the one or more rotary piston pneumatic motors is in operative connection with the at least one of the plurality of wheels via a gear system comprising a first gear in operative connection with the drive shaft of the at least one of the one or more rotary piston pneumatic motors and a second gear in operative connection with an axle about which the at least one of the plurality of wheel rotates, the gear system having a conversion ratio in the range of 1.5:1.0 to 1.0:1.5, and wherein the second gear is in operative connection with a differential;

providing at least one tank for storage of a pressurized gas in operative connection with the one or more rotary piston pneumatic motors to supply the pressurized gas to the one or more rotary piston pneumatic motors;

providing a control system in operative connection with the at least one tank and with the one or more rotary piston pneumatic motors, wherein a cumulative maximum torque for the one or more rotary piston pneumatic motors is at least 16 Nm, the control system comprising a flow control valve in fluid connection with the at least one tank and the one or more rotary piston pneumatic motors to provide a maximum velocity of 2.7 m/s for the personal mobility wheelchair or scooter; and and controlling the control system to provide a maximum velocity of 2.7 m/s.

* * * * *